United States Patent
Minato et al.

(10) Patent No.: US 7,350,276 B2
(45) Date of Patent: Apr. 1, 2008

(54) INTEGRALLY MOLDED SURFACE FASTENER, AND CONTINUOUS PRODUCTION METHOD AND CONTINUOUS PRODUCTION DEVICE THEREFOR

(75) Inventors: Tsuyoshi Minato, Toyama-ken (JP); Eiji Gonda, Toyama-ken (JP); Mitsuru Akeno, Toyama-ken (JP)

(73) Assignee: YKK Corporation, Tokyo (JP)

( * ) Notice: Subject to any disclaimer, the term of this patent is extended or adjusted under 35 U.S.C. 154(b) by 245 days.

(21) Appl. No.: 10/525,445

(22) PCT Filed: Aug. 28, 2003

(86) PCT No.: PCT/JP03/10945

§ 371 (c)(1),
(2), (4) Date: Feb. 23, 2005

(87) PCT Pub. No.: WO2004/021824

PCT Pub. Date: Mar. 18, 2004

(65) Prior Publication Data

US 2006/0096072 A1    May 11, 2006

(30) Foreign Application Priority Data

Sep. 6, 2002  (JP) .............................. 2002-261566

(51) Int. Cl.
*A44B 18/00* (2006.01)
(52) U.S. Cl. ..................... 24/452; 264/167; 264/210.1; 264/280
(58) Field of Classification Search .................. 24/450, 24/452, 446, 449; 264/167, 210.1, 280
See application file for complete search history.

(56) References Cited

U.S. PATENT DOCUMENTS

| 3,192,589 | A |   | 7/1965 | Pearson |
| 4,984,339 | A |   | 1/1991 | Provost et al. |
| 5,537,723 | A |   | 7/1996 | Yoshida et al. |
| 5,887,320 | A | * | 3/1999 | Provost ....................... 24/452 |
| 6,162,040 | A | * | 12/2000 | Clune ......................... 425/363 |
| 6,996,880 | B2 | * | 2/2006 | Kurtz, Jr. et al. ............. 24/446 |

(Continued)

FOREIGN PATENT DOCUMENTS

JP          02-005947         1/1990

(Continued)

*Primary Examiner*—James R. Brittain
(74) *Attorney, Agent, or Firm*—Alston & Bird LLP

(57) ABSTRACT

In a molded surface fastener (10) having engaging elements (2) of minute dimension of thermoplastic resin molded together with a base member (1) by continuous molding, each engaging element (2) comprises first and second engaging portions (22a, 22b) each having a different configuration extending in parallel to a surface of the base member from a top end of a pillar portion (21) rising from the base member (1) such that they intersect at right angle. The second engaging head (22b) has an ordinary hook shape structure while the first engaging head (22a) has a wing-like thin plate structure as seen in a plan view.

The engaging elements having such a structure in which each engaging element has appropriate engagement force, shearing force and separation force so as to keep an excellent tactile feeling of a surface of the surface fastener, prevents itself from falling down against a pressing force, secures a high engagement ratio with mating pile pieces and satisfies a durability.

8 Claims, 11 Drawing Sheets

U.S. PATENT DOCUMENTS

2003/0106188 A1* 6/2003 Armela et al. ................ 24/451

FOREIGN PATENT DOCUMENTS

| JP | 06-133808 | 5/1994 |
| JP | 8-508910 | 9/1996 |
| JP | 09-322812 | 12/1997 |
| JP | 11-056413 | 3/1999 |
| JP | 11-155612 | 6/1999 |
| JP | 2000225650 A * | 8/2000 |
| JP | 2002-262908 | 9/2002 |
| WO | 98/57565 | 12/1998 |

* cited by examiner

INTEGRALLY MOLDED SURFACE FASTENER, AND CONTINUOUS PRODUCTION METHOD AND CONTINUOUS PRODUCTION DEVICE THEREFOR

TECHNICAL FIELD

The present invention relates to a surface fastener obtained by molding a flat base member and a number of engaging elements integrally and continuously using thermoplastic resin, a production method and production device therefor, and more particularly to an integrally molded surface fastener in which the engaging elements are unlikely to fall down despite their fine dimension and engage minute pile pieces of unwoven fabric securely so as to secure a specified engaging force, a separation force and a high engagement ratio, this integrally molded surface fastener being capable of enduring several engaging/disengaging operations sufficiently, and preferably applied to paper diaper, medical simple clothing, napkins, various kinds of working simple clothing, underwear and the like, and a production method and production device therefor.

BACKGROUND ART

In recent years, as a fastening device for disposable paper diaper, medical simple clothing, napkins, various kinds of working simple clothing, underwear and the like, the surface fasteners each having a number of engaging elements of minute dimension molded integrally with a flat base material by continuous injection molding of thermoplastic resin have been often used. The configuration of the engaging element of the integrally molded surface fastener of this kind is classified largely to hook type and mushroom type as well known in the related field.

Typical hook type integrally molded surface fasteners have been disclosed in, for example, U.S. Pat. No. 4,984,339 and U.S. Pat. No. 5,537,723. In case of these molded surface fasteners, molten resin is supplied to the circumferential face of a cylindrical drum in which a number of substantially letter J shaped cavities are formed such that they are open to the circumferential face in a curved configuration from inside of the drum so as to mold a thin base material along the circumferential face while at a time, an inverted letter J shaped hook is molded integrally with the rear face of the base material by filling the cavity with part of molten resin. After cooling, a molded product is produced by peeling it from the circumferential face of the drum.

An integrally molded surface fastener having a modified configuration of the aforementioned hook type engaging element has been also disclosed in, for example, Japanese Patent Laid-Open Publication No. 2-5947 and Japanese Patent Laid-Open Publication No. 6-133808. Upon production of the molded surface fastener, molten resin is extruded from an extrusion die having a number of openings erected in the form of substantially two leaf palm tree or letter T on a narrow slit extending horizontally, so that a number of rows of ribs having palm tree shaped or letter T shaped section in the extrusion direction are molded continuously on a thin base member so as to produce a primary molded product. Next, the rib of the primary molded product is cut out successively by a predetermined thickness along the length direction and then, palm tree shaped or letter T shaped engaging elements are fit thereto. After that, the base member is extended in the molding direction so as to separate the respective engaging elements by a predetermined pitch so as to product a molded surface fastener having a final configuration.

More recently, molded surface fasteners having a novel hook configuration in which the aforementioned hook type engaging element configuration is modified largely have been developed. Those molded surface fasteners have been disclosed in, for example, Japanese Patent Laid-Open Publication No. 9-322812 and Japanese Patent Laid-Open Publication No. 11-56413. The engaging element of these publications comprises an erecting portion which erects upward from the surface of the base member, a neck portion which separates in the molding direction with a V-shaped gap at the top end of the erecting portion and engaging head extending substantially horizontally back and forth in the molding direction from each neck portion. Further, the bottom face of the engaging head is inclined obliquely upward as it goes toward the front end and its top face is a flat plane and in a front view along the molding direction, expanded portions each having a predetermined thickness in the vertical direction are provided on the right and left sides of the top face.

As its basic production method, the primary molding technology using the aforementioned cylindrical drum has been adopted. However, the engaging element molded on the surface of a base member upon molding is not molded in the form of letter J from the beginning, but in a side view along the molding direction, a primary engaging element material having two V-shaped or four cross-shaped branches extending upward in an inclined state at the top end of its erected portion is molded preliminarily, so that a preliminarily molded surface fastener in which a number of the primary engaging element materials are molded integrally on the base member is produced. Then, by pressing the branch portions of the primary engaging element materials of the preliminarily molded surface fastener with heat, the top portion is softened and deformed to mold engaging elements having peculiar configuration, which the conventional art has never seen.

On the other hand, the mushroom type molded surface fastener has been also well known since before and according to for example, U.S. Pat. No. 3,192,589, after the preliminarily molded surface fastener in which a number of pillars are erected on the surface of the base member is molded, the front ends of the pillars of the molded product is softened by heating so as to mold semi-spherical engaging heads for manufacturing of the molded surface fastener. For example, Japanese Patent Laid-Open Publication No. 8-508910 has disclosed an improvement technology of the mushroom type molded surface fastener. According to the molded surface fastener disclosed in this publication, the front ends of the pillars of the primary molded product are softened by pressing and heating so as to mold circular plate engaging heads instead of the semi-spherical engaging heads.

Because the aforementioned mushroom type engaging element engages in all directions, it has been known that it has stronger engaging strength and separation strength than the hook type engaging element whose engagement has a directivity. However, because in the engagement mechanism of the pile to the mushroom type engaging element, the pile engages in so-called hanging condition that it winds up around the neck portion, if it is intended to release the pile from the engaging head, the probability that the engaging element may be cut out or the pile itself may be cut out at the neck portion is high, so that this often cannot bear repeated usage and at a time, the engaging strength and separation strength likely increase excessively.

The molded surface fastener disclosed in the aforementioned Japanese Patent Laid-Open Publication No. 8-508910 is an improvement based on the advantages and disadvantages of the mushroom type and intensifies the engagement ratio to minute piles by forming the shape of the engaging head into a substantially circular shape while securing an appropriate separation strength. This can be adopted as a fixing device to various kinds of unwoven minute piles, which are attached to the aforementioned disposable diaper. The application of such fixing device has been expanding rapidly as described above, and a further improvement has been still proposed in, for example, International Publication No. 98/57565 pamphlet. That improvement aims at intensifying the plasticity of the engaging head by forming much minute unevenness on the top face of the circular engaging head.

On the other hand, as compared to the mushroom type engaging element, the aforementioned hook type engaging element is more likely to engage the pile and further, obtain appropriate engagement strength and separation strength. At the time of separation, the engaging elements and piles are never cut out and can bear repeated usage. In addition to the aforementioned Japanese Patent Laid-Open Publication No. 6-133808 and Japanese Patent Laid-Open Publication No. 9-32281, for example, Japanese Patent Application No. 2001-64460 filed by these inventors has proposed an integrally molded surface fastener to adopt such advantages of the hook type for the fixing device of the disposable diaper and the like.

This integrally molded surface fastener is a molded surface fastener having minute engaging elements of thermoplastic resin which are molded together with the base member by continuous molding. The engaging element is composed of a single pillar portion comprising first and second pillar portions which intersect with each other at right angle having a substantially cross shaped section. The pillar portions extend in opposite directions to each other in a wing-like form along the intersection directions of the first and second pillar portions with respect to the top end of the pillar portion and have a thin engaging head having substantially the width as the width of the top end of the second pillar portion.

If such minute engaging elements having the peculiar head configuration are molded, securely they engage fiber piles planted densely and individual engaging elements can secure appropriate engaging force, shearing force and separation force and at a time, the tactile feeling of the surface fastener is improved. The height of the engaging element projecting from the surface of the base member can be reduced as compared to conventional type. On the other hand, because the sectional shape of the pillar portion is formed into a cross shape as described above, the engaging element is blocked from falling down against a pressing force so as to secure a high engagement ratio with mating pile pieces. Consequently, a durability demanded to this kind of the fixing device is satisfied and desired plasticity and shearing strength of the flat base member can be secured.

According to the production technology of the hook type molded surface fastener disclosed in the aforementioned Japanese Patent Laid-Open Publication No. 6-133808, a number of ribs erected on the base member of a preliminarily molded surface fastener molded primarily are cut out successively by a predetermined pitch along the length direction and its base member is stretched in the length direction (molding direction) so as to separate individual engaging elements to a predetermined interval. Therefore, the thickness in the molding direction of the engaging element is determined by a cutting pitch and its stiffness is determined by the material and cutting thickness of used resin. Thus, if it is intended to obtain engaging elements which engage/disengage minute piles like for example, unwoven cloth surface according to such a production method, naturally the thickness in the molding direction becomes very small, so that they are likely to buckle in the molding direction. Thus, the stiffness cannot be improved until the thickness is increased.

In case of the molded surface fastener having the hook type engaging elements based on the aforementioned Japanese Patent Laid-Open Publication No. 9-322812 or Japanese Patent Laid-Open Publication No. 11-56413, although the fall-down of the erected portion decreases and the engagement ratio is secured because of the peculiar shape of the engaging element, necessary separation strength is more difficult to obtain as the minuteness progresses and increase in the separation strength to the disposable diaper and the like has been strongly demanded as described above. As compared to the engaging element according to the Japanese Patent Application No. 2001-64460, although a high engagement ratio with a mating pile piece is secured by preventing the fall-down of the engaging element against a pressing force, so that the durability required for this kind of the fixing device is satisfied and desired plasticity and shearing strength of the flat base member can be secured, it cannot be said that its engaging force and separation strength are sufficient.

On the other hand, in case of the molded surface fastener having the mushroom type engaging element disclosed in the aforementioned Japanese Patent Laid-Open Publication No. 8-508910 or International Publication No. 98/57565 pamphlet, despite its minuteness, the root portion having an arbitrary size can be molded to provide with a required stiffness which prevents its buckling. However, if it is intended to provide the root portion with a desired stiffness, the size of the root portion cannot help being increased.

If the diameter of the root portion increases, even if the extending length of the engaging head which extends from the root portion to all directions is to be minute, necessarily the diameter of the engaging head increases by the amount corresponding to the increase in the diameter of the root portion, so that no minute engaging element can be molded and if it is molded in a large size, naturally it is difficult to engage a loop. Further, even if the engaging element is molded in a minute size, the so-called hanging, which occurs in the mushroom from the peculiar configuration, cannot be avoided and it is cut out easily between the pillar portion and the engaging head or the mating pile is cut out easily. Thus, it is difficult to secure a necessary durability.

As for a problem which this kind of the integrally molded surface fastener faces, if it is used as a disposable paper diaper, medical simple clothing, napkins, various of working clothing, underwear and the like, an engaging object becomes extremely minute piles exposed on the surface of ordinary unwoven cloth or knitted fabric, necessarily, the size of the engaging element of the integrally molded surface fastener needs to be small and particularly, because there is much opportunity that it makes contact with soft skin of infant, the engaging element needs to have mild tactile feeling as well as plasticity. Further, this engaging element needs to bear repeated usage of two or three times sufficiently although it is disposable and at a time, the separation strength needs to be high enough for the diaper not to loose out easily.

In case of a conventional integrally molded surface fastener, the engaging element can be molded in minute sizes, and for example, in case of the mushroom type engaging element, its separation strength is too high so that the minute pile or engaging element itself is likely to be damaged at the time of separation. In case of the hook type engaging element, there is a problem that a desired separation strength cannot be secured although it never damage the minute piles or engaging elements itself.

DISCLOSURE OF THE INVENTION

The present invention has been accomplished to solve these diversified problems and an object of the invention is to provide an integrally molded surface fastener which is capable of engaging minute dense fiber piles composed of unwoven fabric or knitted fabric in all directions securely, provides individual engaging elements with appropriate engaging force, shearing force and separation force, has an excellent tactile feeling on the surface of the surface fastener, secures a high engagement ratio with mating pile pieces, satisfies a durability demanded for this kind of fixing device and secures desired plasticity and tear strength of its flat base member, a production method therefor and a production device therefor.

Such an object is achieved by an integrally molded surface fastener of synthetic resin in which a number of fine engaging elements, which engage/disengage a mating pile piece, are molded integrally on a surface of a flat base member, be characterized in that each engaging element comprises a pillar portion having a predetermined height and an engaging head composed of first and second engaging portions, which extend from a top end of the pillar portion along the surface of the base member in a first direction and in a second direction different from the first direction, and the first and second engaging portions have different shapes.

According to the present invention, the engaging head formed at the top end of the pillar portion comprises first and second engaging portions extending in first and second directions along the surface of the base member. That is, if the first and second engaging portions are seen in a plan view, while the first engaging portion extends vertically in the form of L shape or cross shape, there are two or more second engaging portions extending in a different direction from the first engaging portion. Further, according to the present invention, the shapes of the first and second engaging portions are different. For example, as stipulated in claim 2, the first engaging portion is composed of wing-like thin plate and the second engaging portion is composed of ordinary hook piece. Of course, they may be formed in inverse configurations and the shape of the hook piece may be of substantially letter V or letter T as well as of inverted letter J. Further, it is permissible that the top face of the substantially letter V or letter T shaped element is a flat plane and expanded portions extend from side edges perpendicular to that extending direction.

The wing-like thin plate mentioned in the present invention refers to a thin plate of an ½ elliptic shape, rectangular shape or triangular shape whose front end is a sharp angle. The present invention may be formed in a substantially letter L shape as seen in a plan view such that the wing-like thin plate is formed to extend in one direction from the top end of the pillar portion and the second engaging portion having the hook shape extends in the other direction from the top end of the pillar portion, intersecting with the wing-like thin plate. Alternatively, the present invention may be formed in a substantially cross shape such that the wing-like thin plate and the second engaging portion extend in opposite directions to each other across the top end of the pillar portion.

Further, two or more second engaging portions may be extended in parallel such that they intersect the wing-like thin plate.

The shape of the wing-like thin plate as seen in a side view may be decreased gradually from the proximal end to the front end in thickness instead of simply being linear and particularly, the bottom face may be formed into an inclined face which is inclined obliquely upward. Although the extension length and width dimension can be determined arbitrarily, they are changed depending on the relation with the width of the top end of the pillar portion or the size or shape of a pile on the surface of unwoven fabric which is a mating object. In the meantime, the height of the pile projecting from the surface of unwoven fabric or knitted fabric for use in the pile engaging portion of disposable paper diapers or the like is extremely minute, that is, about 0.35 to 1.1 mm.

Thus, if the engaging head is formed in a thickness as small as possible and its width is set to a small one, the engaging head can be allowed to invade into the minute pile. However, if the thickness of the engaging head is excessively small and the width is too small, it is difficult to obtain a desired engagement strength or separation strength. Thus, it is very important to control the thickness and width arbitrarily. For example, the thickness in the vertical direction of the front end of the engaging head can be formed smaller than the proximal end and in this case, it not only likely invades into the mating pile but also if the pile is engaged, the engagement strength and separation force increase because the thickness in the vertical direction of the engaging head near the proximal end is large. As for the engagement style between the engaging element and pile of the present invention, the pile winds up around the first and second engaging portions in pair extending in both ways with respect to the pillar portion at a time, often engaging them by hooking on the pillar side of engaging head. Because the wing-like thin plate and hook plate are supported by the pillar portion in a cantilevered style, it looses out from the pile relatively easily different from the mushroom type.

The front end of the wing-like thin plate of the first engaging portion can be curved toward the surface of the base member. Although the basic configuration of the wing-like thin plate is a horizontal thin plate, according to the present invention, the front end of the wing-like thin plate is curved downward. Due to this curve, an engaging pile is hooked by that curved portion thereby the engagement strength and separation strength being increased. Further, the central portion of the top face of the engaging head composed of the first and second engaging portions is preferred to be dented slightly with respect to the other top face portions. Due to this dent, when it is intended to remove a pile engaging the engaging element, it is easy to bent across a border between the dent portion and the engaging head extending from the first pillar portion. Even if the proximal end portion of the engaging head is thick in the vertical direction, the pile can be removed from the engaging head easily and a necessary separation strength can be obtained.

The pillar portion is preferred to have a horizontal section which intersects with the first direction x and the second direction y of the first and second engaging portions in a same direction. The pillar portion may be formed such that its sectional area decreases gradually from the proximal end to the top end. Because according to the present invention, when the pillar section provides a substantially cross shape or letter L shape, the stiffness in the x direction and y direction which intersect with each other at right angle increases, even if the quantity of used material is reduced, difficulty of being buckled is not inferior to a square section whose side has the dimension as the width of the first and second pillar portions or a pillar portion having a circular section whose diameter is the as the width.

However, if the pillar portion is constructed of a mere rectangular pillar portion, when it is pressed from above in order to make it engaged the mating pile or remove the pile in engagement, the pillar falls down at its root easily. Thus, preferably, by decreasing the sectional area of the pillar portion gradually toward the engaging head, the stiffness of the proximal end side is increased to make it difficult to fall down.

Preferably, the base member is formed with a dented portion between the adjacent pillar portions in the molding direction of the base member, not formed of a mere flat plate. When the engaging element is raised from the bottom face of the dented portion, even if the distance between the bottom face of the front end of the engaging head and the starting point of the pillar portion (bottom face in the dented portion) is set to the as conventionally, the distance from the bottom end of the front end of the engaging head and the surface of the base member except the dented portion becomes identical to a difference between an actual height from the proximal end of the pillar portion and the depth of the dented portion. Thus, although the actual height of the engaging element erected from the base member is identical to the conventional type, an apparent height projecting from the surface of the base member is a short dimension obtained by subtracting the depth of the bottom face of the dented portion. Further, if the dented portion is formed in the surface of the base member, the plasticity of the base member is improved remarkably even if the apparent thickness is same as the conventional type, and further when the surface fastener is peeled out of the molding die after the molding is finished, the base member is not stretched excessively or torn out but it can be peeled out stably.

As a result, the base member in a molded product is never waved and thus, a high quality product bearing actual use sufficiently can be obtained. If the height of the pillar portion from the bottom face of the dented portion is substantially ⅕ to ⅘ the height from the bottom face up to the vertex of the front end of the engaging head, the pillar portion becomes difficult to fall down because a portion projecting from the surface except the dented portion of the base member of the pillar portion is relatively low, thereby stabilizing the configuration at the time of engagement. Further, if the dented portion has a width allowing the mating pile to be introduced, the engagement ratio with the pile increases.

As for the preferred dimensions of the engaging element of the present invention, the length between the vertex of the front end of the engaging head and the surface of the base member is 0.1 to 1.2 mm, the extending length of the engaging portion from the pillar portion is 0.2 to 0.5 mm and the height of the pillar portion from the surface of the base member is 0.005 to 1.0 mm. These numerical ranges are basic numerical ranges which are sufficient for securing an engagement with the pile piece (pile) having the minute configuration which is an engagement object of the present invention and are ranges which provide no rigidity feeling at the time of engagement or disengagement. Particularly, their lower limits are values which enable secure engagement to even fiber piles having the finest configuration of ordinary unwoven fabric.

As for the arrangement of the engaging elements having the above-mentioned configuration on the base member, the first and second engaging portions are disposed perpendicularly to the molding direction of the base member while the second engaging portion is disposed in parallel to the molding direction of the base member. However, the first engaging portion may be disposed in parallel to the molding direction of the base member and the second engaging portion may be disposed perpendicularly to the molding direction of the base member. To direct the engaging head in two different directions, in the molding direction and in a direction perpendicular to that direction, according to the invention about the production method described later, this is achieved by forming the first and second engaging portion molding cavities by turning around them by 90°.

As a result, the first and second engaging portions whose extending directions are altered by 90° are disposed mixedly in terms of the molding direction on the base member. By disposing engaging elements whose first and second engaging portions are directed in two directions, the molding direction and in a direction perpendicular to that direction mixedly, the engagement ratio to the mating pile is improved. The arrangement style can be determined in an arbitrary way, the engaging elements can be disposed alternately in matrix on the surface of the base member or in a staggered fashion.

The molded surface fastener comprising the engaging elements having such a configuration can be produced easily and effectively according to the following continuous production method. That is, the production method is characterized by comprising: rotating a cylindrical drum in one direction, the cylindrical drum having a number of preliminarily molded element molding cavities each composed of a main cavity which is open in a circumferential face and extends linearly up to a predetermined depth and a second engaging portion molding cavity which is not open in the circumferential face and is branched from halfway of the main cavity and extends in a molding direction or in a lateral direction with respect thereto; injecting molten resin continuously to the circumferential face of the cylindrical drum, molding the base member along the circumferential face while molding a number of preliminarily molded elements on a back side of the base member such that they erect upright; peeling a belt-like preliminarily molded surface fastener from the circumferential face of the cylindrical drum, the preliminarily molded surface fastener having the preliminarily molded elements on the base member which moves carried by the circumferential face of the rotating cylindrical drum; feeding the preliminarily molded surface fastener peeled continuously to a with-heat pressing portion; and pressing at least a preliminarily molded first engaging portion erected linearly of the preliminarily molded portions erected integrally from the surface of the base member of the carried preliminarily molded surface fastener with heat, melting and deforming into a flat wing-like thin plate so as to mold the first engaging portion successively.

The most prominent configuration of this production method exists in the shape of the cavity formed in the circumferential face of the cylindrical drum and the shape of the preliminarily molded element of the engaging element molded by the cavity. As for the shape of this preliminarily molded element, no preliminarily molded material erected with the section is molded from the back side of the base member like molding of the conventional mushroom type but this preliminarily molded material comprises a preliminarily molded pillar portion having an arbitrary section on the proximal end side of the preliminarily molded element, a preliminarily molded first engaging portion erected linearly and continuously at that portion and a hook piece which is a preliminarily molded second engaging portion branched and extending from the top end of the preliminarily molded pillar portion.

Further, the present invention may include a case where the preliminarily molded first engaging portion is melted and deformed into a flat wing-like thin plate by pressing with heat with the with-heat pressing portion while the top end of the preliminarily molded second engaging portion is also melted and deformed at a time. In this case, although the configuration of the preliminarily molded second engaging portion may be curved in the form of a hook such that its front end faces downward from the beginning when it is branched from the preliminarily molded pillar portion, it is preferred to rise obliquely upward linearly and then branch. When molding into a linear configuration, the top end of the preliminarily molded second engaging portion is heated under a pressure by the with-heat pressing portion while its proximal end is curved, so that the top surface from the front end to the center is melted and deformed into a flat hook shape. Due to such a configuration, a predetermined engagement force with a mating pile can be obtained although it is smaller than a complete hook type.

On the other hand, the distance between the top end of the preliminarily molded second engaging portion and the surface of the base member is preferred to be shorter than the distance between the top end of the preliminarily molded first engaging portion and the surface of the base member. The difference in distance from the base member to the top end of both the preliminarily molded first engaging portion and the preliminarily molded second engaging portion is determined by the length, width, thickness and the like of the first engaging portion extending from the pillar portion obtained by following molding. The thickness and extension length of the first engaging portion can be controlled by controlling the amount of resin in the preliminarily molded first engaging portion and the quantity of deformation due to pressing at the time of the heating under a pressure. Further, the extension direction of the first engaging portion can be changed arbitrarily by selecting the molding direction or the direction perpendicular to the molding direction as the direction of its long side when the sectional shape of the pillar portion is rectangular.

This preliminarily molded element is molded into an engaging element having the aforementioned peculiar configuration by melting and deforming the preliminarily molded first engaging portion substantially up to the top end of the preliminarily molded pillar portion by following heating under pressure. Thus, the preliminarily molded pillar portion itself is not melted and deformed so much but maintains its original shape to turn to a pillar portion of a subsequent engaging element. The preliminarily first engaging portion extending upward linearly from the top end is melted and deformed by heating under pressure and the first engaging portion composed of a substantially wing-like thin plate is molded. The preliminarily second engaging portion branched and extending sideway from the top end of the preliminarily molded pillar portion is sometimes melted and deformed by heating under pressure or sometimes is not influenced by heating under pressure depending on its molding configuration.

Such a method is executed through continuous production with an integrally molded surface fastener production device of the present invention. That device comprises: a cylindrical drum rotating in one direction and having a number of preliminarily molded element molding cavities composed of a main cavity which is open in a circumferential face and extends up to a predetermined depth and a second engaging portion molding cavity which is branched from halfway of the main cavity and extends in a molding direction; a continuous injecting unit which injects molten resin continuously to the circumferential face of the cylindrical drum so as to mold the base member along the circumferential face, and molds a number of preliminarily molded elements on a back side of the base member such that they are erected upright; a take-up means for peeling a belt-like preliminarily molded surface fastener from the circumferential face of the cylindrical drum continuously, the preliminarily molded surface fastener having the preliminarily molded elements on the base member which moves carried by the circumferential face of the rotating cylindrical drum; and a with-heat pressing portion which presses with heat at least a preliminarily molded portion erected linearly of the preliminarily molded elements erected integrally from the surface of the base member of the peeled preliminarily molded surface fastener so as to melt and deform into a wing-like thin plate to mold the first engaging portion successively.

The with-heat pressing portion comprises an internal heating unit containing a carrying face for the preliminarily molded surface fastener and a pressing rotation roll containing a rotation shaft which is included in a plane above and in parallel to the carrying face and extends in a direction perpendicular to the moving direction of the preliminarily molded surface fastener, wherein a gap between the bottom end position of the pressing rotation roll and the carrying face is set as same as a dimension gained by adding the setting dimension in the vertical direction of the first engaging portion to a sum of the dimensions in the vertical direction of the base member and said pillar portion. The internal heating unit mentioned here refers to a unit which accompanies internal heat generation due to moving of molecules in material itself without heating resin material which become melting object from outside, such as ultrasonic heating unit and high frequency heating unit. By disposing the continuous injecting unit, the cylindrical drum, the take-up means and the with-heat pressing portion continuously, a molded surface fastener of the present invention in which a number of engaging elements having the above-described embodiment are molded integrally on the continuous base member can be produced effectively and continuously.

Further, the present invention includes a with-heat pressing member which is disposed above the carrying face and has an inclined face in which the gap between the bottom face and the carrying face decreases gradually in the direction of fastener, instead of the pressing rotation roll, and a gap of the narrowest portion between the carrying face and the inclined face is as same as a dimension gained by adding the setting dimension in the vertical direction of the second engaging portion to a sum of the dimensions in the vertical direction of the base member and the pillar portion.

If the minimum gap between the pressing face of the with-heat pressing portion and the surface of the base member is set as described above, the engaging head having the above-described configuration is formed continuously only by introducing a preliminarily molded surface fastener molded on the rotation drum into the with-heat pressing portion and allowing it to pass. Although the minimum gap between the pressing face and the inclined face portion of the pressing rotation roll and the surface of the base member is set identical to the thickness of the first engaging portion whose thickness in the vertical direction is set up when the preliminarily molded first engaging portion is deformed by pressing, if the gap is slightly larger, a region on the border between the preliminarily molded first and second engaging portions and the preliminarily molded pillar portion is not melted or deformed, to secure a neck portion between the pillar portion and the engaging head.

Needless to say, a case where such a neck portion is formed is included in the technical scope of the present invention. If the neck portion is molded between the pillar portion and the engaging head, when it is intended to remove a mating pile wound around the neck portion upon engagement, the neck portion swings so as to incline the pile in the separation direction, facilitating the removal of the pile as compared to a case where no neck portion exits, thereby preventing the pile from being cut out meaninglessly.

If the heating temperature of the with-heat pressing portion is set near the melting point of the resin material or the time for heating with pressure on the preliminarily molded surface fastener is prolonged, the extending side ends of the engaging head are softened more so that they droop downward with curve by their own weight, thereby increasing the engagement force with the mating object.

In the production of the molded surface fastener of the present invention, for molding of the preliminarily molded surface fastener, preferably, a cooling means is incorporated in a cylindrical drum or a preliminarily molded surface fastener accompanying region of the cylindrical drum is immersed into a cooling bath so as to cool aggressively and the molded surface fastener, after passing the with-heat pressing means, is wound up after cooled gradually under the normal temperature without cooling aggressively by specific cooling means. As the engaging head softened and deformed with heat is cooled gradually and solidified, the heated portion is crystallized progressively so that the stiffness of the engaging head becomes higher than that of the pillar portion. At this time, a heating range, heating time and heating temperature can be controlled appropriately depending on the dimension and modified shape of the engaging element.

In case of the integrally molded surface fastener cooled and solidified rapidly without progressive crystallization between the base member and the pillar portion of the preliminarily molded element, the base member and pillar portion maintain plasticity and the stiffness of the engaging head increases. Thus, even in case of a molded surface fastener composed of very minute engaging elements and having a very high plasticity, the stiffness of its engaging head is secured so as to improve bending strength, thereby securing a resistance in the shearing direction. Consequently, there is provided a molded surface fastener of the present invention having a desired engagement strength and separation strength.

BEST MODE FOR CARRYING OUT THE INVENTION

Hereinafter, preferred embodiments of the present invention will be described specifically on the basis of embodiments represented in drawings.

Figure 1:
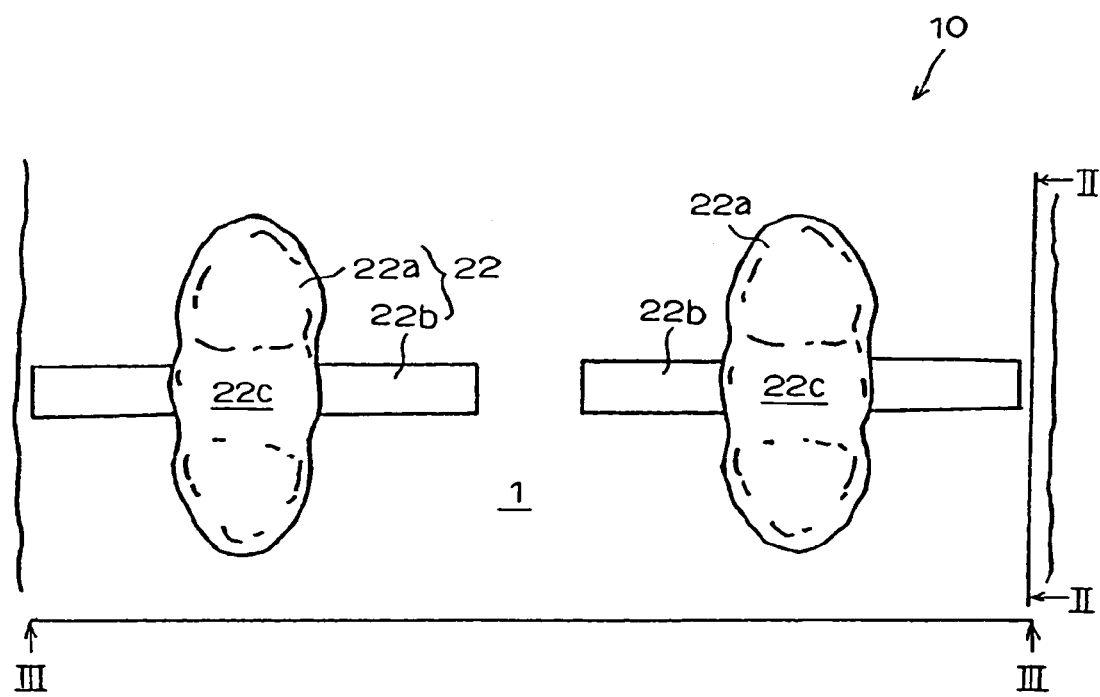
FIG. 1 is a partial plan view showing a first structure example of a molded surface fastener of the present invention.
Figure 2:
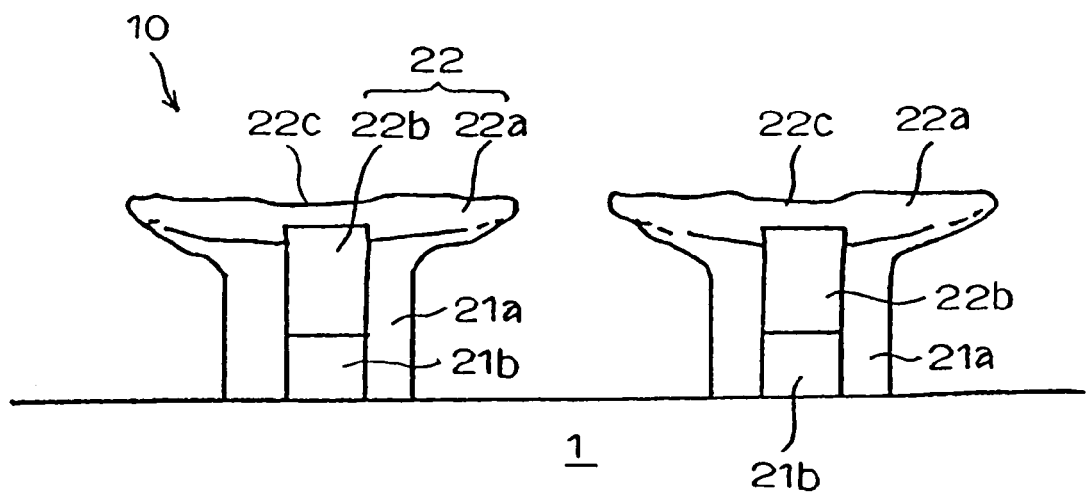
FIG. 2 is a sectional view taken along the line II-II in FIG. 1.
Figure 3:
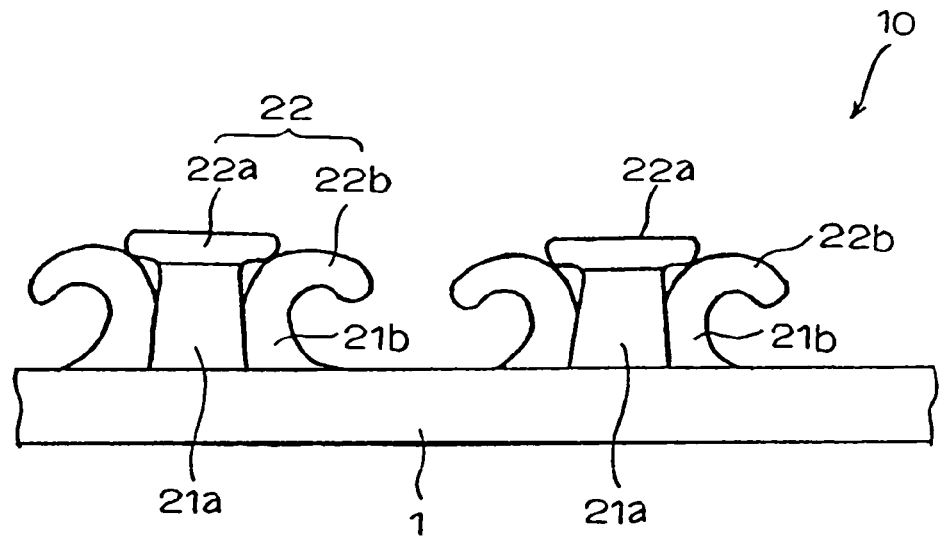
FIG. 3 is a sectional view taken along the line III-III in FIG. 1.
Figure 4:
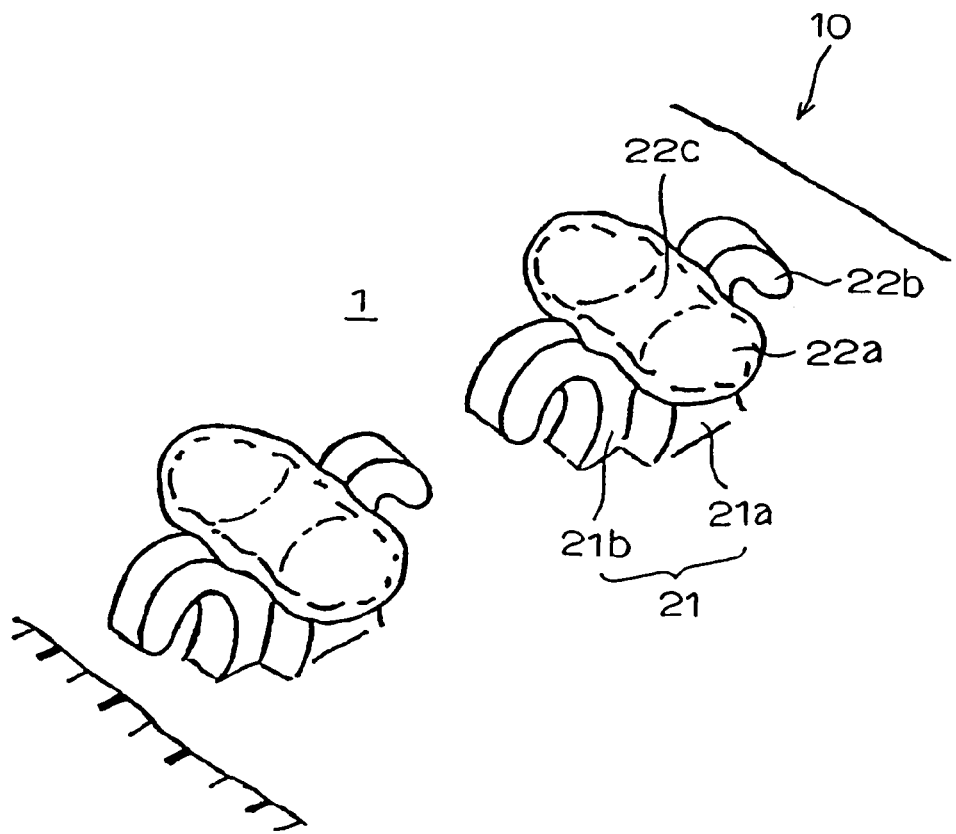
FIG. 4 is a perspective view showing part of the molded surface fastener in enlargement.

FIG. 1 is a partial plan view of a molded surface fastener having typical engaging element configuration according to the first embodiment of the present invention. FIG. 2 is a sectional view taken along the line II-II, FIG. 3 is a sectional view taken along the line III-III and FIG. 4 is a perspective view of part of the molded surface fastener as seen from obliquely above.

An engaging element 2 of this embodiment comprises a pillar portion 21 rising vertically from a surface of a flat base member 1 and at its top end, an engaging head 22 including a first engaging portion 22a which extends in wing-like construction in opposite directions to each other, perpendicular to the molding direction (y direction) and a hook-like second engaging portion 22b which extends in opposite directions to each other with respect to the molding direction. The pillar portion 21 includes a first pillar portion 21a and a second pillar portion 21b, which are formed integrally such that they intersect each other at right angle and all portions from its proximal end to its top end have a substantially cross shape. Thus, the sectional shape of the pillar portion 21 may be determined arbitrarily, for example, circular, elliptical, just rectangular, polygonal or the like.

According to this embodiment, a dimension of the first pillar portion 21a having a rectangular section in such a direction that it intersects the second pillar portion 21b is set up substantially equal throughout the vertical direction. A dimension of the second pillar portion 21b in a direction that it intersects the first pillar portion 21a is in such a manner that its bottom end portion rises such that it curves mildly in the molding direction and that dimension decreases gradually from halfway of it as it goes toward the top end. By adopting the pillar portion 21 having the cross shaped section, stiffness of the molded surface fastener 10 in the molding direction and in a direction intersecting the molding direction can be intensified, so that this surface fastener is molded unlikely to fall down with respect to a pressure generated when the surface fastener 10 is engaged, or when the engagement of the engaging element 2 is released. Because the second pillar portion 21b is increased gradually in the molding direction from its top end to its proximal end, buckling thereof at the proximal end and fall-down of the engaging element 2 can be avoided more when comparing with a case where it is formed with the dimension from the top end up to the proximal end. According to this embodiment, the thickness of the base member 1 is 0.1 mm, the height in the vertical direction of the first pillar portion 21a is 0.40 mm, the dimension of the first pillar portion 21a in the direction intersecting the molding direction is 0.45 mm, the width dimension of the second pillar portion 21b in the direction intersecting the molding direction is all 0.15 mm, an interval between adjacent engaging elements 2 in the molding direction is 1.2 mm and an interval between adjacent engaging elements 2 perpendicularly to the molding direction is 1.25 mm.

According to this embodiment, from the top end of the pillar portion 21, the first engaging portion 22a extends substantially horizontally in a direction perpendicular to the molding direction and the second engaging portion 22b extends in the form of a hook along the molding direction. A pair of the first engaging portions 22a extending substantially horizontally in the direction perpendicular to the molding direction from the pillar portion 21 are constituted of wing-like thin plates having substantially same thickness in the vertical direction while the top surface is of a substantially flat plane as shown in FIGS. 1 and 2. The entire shape of this first engaging portion 22a provides a substantially elliptic shape whose ends in the extending direction are circular as shown in FIG. 1. Further, the width dimension of the first engaging portion 22a in the molding direction is slightly larger than the width of the first pillar portion 21a in the direction. In the meantime, according to this embodiment, the width dimension is 0.28 mm, the overall length in the extending direction is 0.69 mm and the height from the surface of the base member up to the top surface is 0.5 mm.

On the other hand, the second engaging portion 22b is formed in a lower height than the first engaging portion 22a and the height of its vertex of the top end is set up substantially equal to or slightly higher than the bottom face of the first engaging portion 22a. Further, the front end curved in the form of a hook from the top end of the second pillar portion 21b is oriented toward the surface of the base member 1. According to this embodiment, the height of the vertex of the first engaging portion 22a from the base member 1 is 0.4 mm while the height of the vertex of the second engaging portion 22b from the base member 1 is 0.35 mm. A distance between the front ends of the second engaging portions 22b in pair extending in opposite directions from the pillar portion 21 is 0.92 mm and as described above, the dimension W3 of the first engaging portion 22a is 0.28 mm. Therefore, the extending length of the second engaging portion 22b projecting from the first engaging portion 22a is 0.32 mm respectively.

Because the engaging element 2 of this embodiment has the above-described structure, the thin plate type first engaging portion 22a and the hook-like second engaging portion 22b, originally likely to engage a pile, which is a mating engaging element, extend in the form of a cross in the molding direction and a direction perpendicular thereto with respect to the pillar portion. Consequently, they are capable of engaging the mating pile in all directions and further because part of them are the hook-like engaging portions, the engagement force is intensified. Further because there is provided a difference in height between the first engaging portion 22a and the second engaging portion 22b, they can engage even piles different in height, thereby the engagement ratio being improved.

Because the engaging head 22 is originally supported in the form of a cross by the first pillar portion 21a and the second pillar portion 21b through its neck portion, it is not buckled easily at its extending, thereby ensuring an appropriate stiffness. Additionally because according to the molding method of the engaging element 2 of the present invention described later, the engaging head 22 is crystallized more than the pillar portion 21, the stiffness of the engaging head 22 is higher than that of the pillar portion.

According to this embodiment, a top central portion 22c of the engaging head 22 is slightly dented with respect to the other top surface 22b. Because the top central portion 22c of the engaging head 22 is dented slightly more than the other top surface, when it is intended to detach the pile engaging the engaging element 2, the extended portion becomes easy to bend along a border between the dented portion and the engaging head 22 extended from the first pillar portion 21a due to the dented portion. Consequently, even if the proximal end portion of the engaging head 22 is thick in the vertical direction, the pile is easy to detach from the engaging head 22 and further, a predetermined separation strength can be obtained.

According to the above-described embodiment, the engaging head 22 including the top end portion of the pillar portion 21 is constructed with a high stiffness as compared to the flat plate base member 1 and the pillar portion 21 as described previously and has a construction easy to bend when it is separated. Thus, stability of the configuration of the engaging element 2 and holding power for the mating pile are intensified and at the time of separation, an appropriate strength is secured. The dimensions of the respective portions of the engaging element 2 described previously indicate only the most preferable example and those dimensions in relation to the mating pile may be changed in various ways within a technical scope described in claims and needless to say, the present invention is not restricted to the above-mentioned dimensions.

The above-mentioned rectangular thin plate type engaging head 22 produces various effective functions which cannot be expected to conventional simple upside-down letter J type, letter L type and letter T type engaging elements.

As the first one of those functions, as described previously, the top surface of the engaging head 22 can be formed into a flat plane thereby eliminating the itchy feeling of the top surface. The second one is that substantially the stiffness as conventional is secured by such a peculiar shape of the pillar portion 21 with a smaller resin amount than the quantity of resin consumed for the conventional pillar portion.

The third function is not a function which only allows to engage a hook which is curved in the form of a hook like a conventional hook-type engaging head and having substantially the same thickness, but a function which allows the mating pile, which is to engage the engaging head 22, to wind around the top end portion of the pillar portion 21 while hooking on the first engaging portion 22a and the second engaging portion 22b in pair extended in opposite directions, so that consequently the mating pile becomes unlikely to be removed from the engaging head 22, thereby improving the engaging force of the engaging head 22 largely.

Additionally, according to this embodiment, because the first and second engaging portions 22a, 22b extending from the pillar portion 21 while cantilevered provide two-leaf style in which the first engaging portion 22a and the second engaging portion 22b extend in opposite directions from the pillar portion 21, different from a conventional mushroom type engaging element having an umbrella like engaging head extending in all directions from the top end of the pillar portion, even if the pile hooks on the top end portion of each pillar portion 21 extending downward in a substantially straight line from the bottom face at the proximal end of the paired extending portions such that it winds thereabout, when a force is applied in the direction of separation, both the first engaging portion 22a and the second engaging portion 22b are deformed elastically so that they are erected via the top end of the pillar portion 21 and the pile moves smoothly along the periphery of the engaging head 22 while receiving a slight friction resistance, so that it detaches smoothly.

For the reason, the engaging element 2 of this embodiment secures a engaging force sufficiently larger than the separation force of conventional simple hook type engaging head and as compared to the mushroom type engaging head, no cutting occurs on the engaging element 2 and the pile and thus, a predetermined engaging force is secured despite minute dimensions.

Although according to this embodiment, the engaging elements 2 on the column and the engaging elements 2 on adjacent column are disposed just side by side, the engaging elements 2 on the adjacent columns may be disposed for example, in a staggered style and in this case, a crevice in a direction perpendicular to the engaging element column on the flat base member 1 can be prevented securely.

Figure 5:
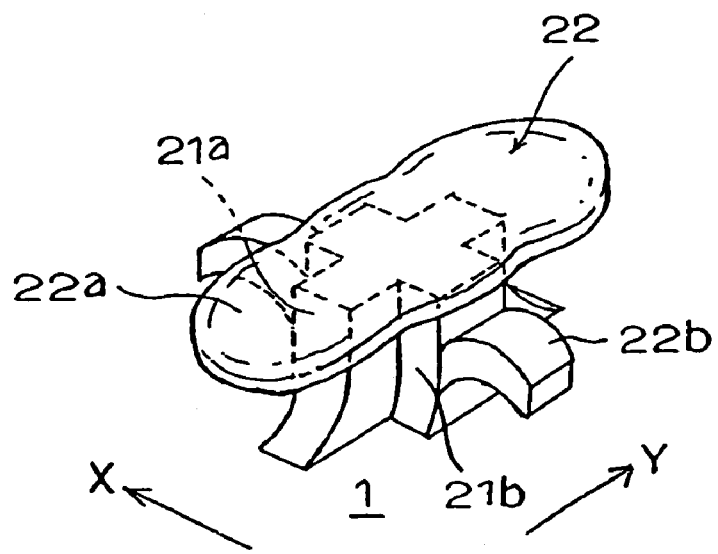
FIG. 5 is a partial perspective view showing a modification of the molded surface fastener.
Figure 6:
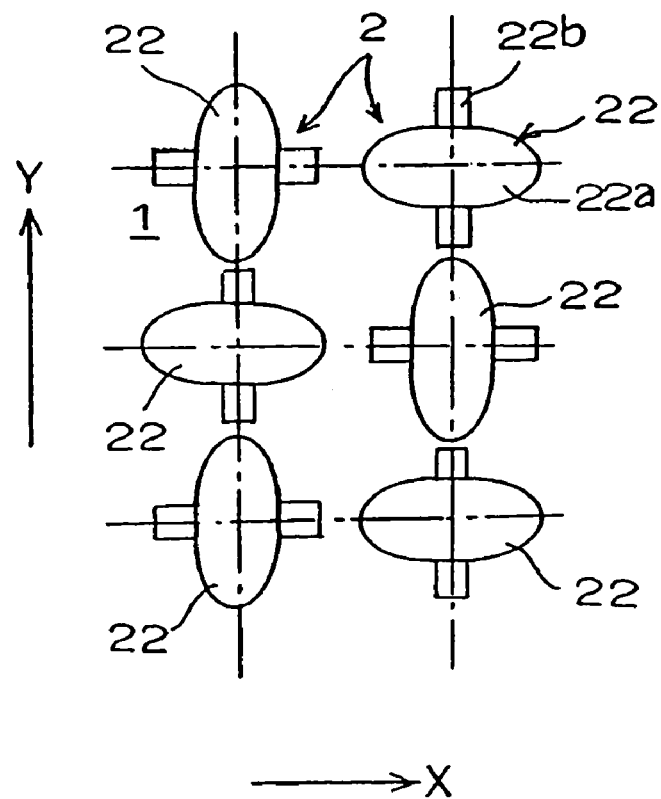
FIG. 6 is a partial plan view showing schematically an example of the arrangement of engaging elements in the molded surface fastener.

Further, although according to the above embodiment, the extending direction of the first engaging portion 22a extending from the pillar portion 21 of the engaging element 2 arranged in the molding direction is all set perpendicular to the molding direction while the extending direction of the second engaging portion 22b is set to the molding direction, it is permissible to reverse the extending direction of the first engaging portion 22a and the extending direction of the second engaging portion 22b as shown in FIG. 5. Thus, the engaging element 2 in which the first engaging portion 22a extends in a direction perpendicular to the molding direction as shown in FIG. 5 and the engaging element 2 in which the first engaging portion 22a extends in parallel to the molding direction can be disposed alternately and as for the entire arrangement, as shown in FIG. 6, it is permissible to dispose the engaging elements 2 whose first engaging portions 22a extend in the direction in the staggered style while the engaging elements 2 whose first engaging portions 22a extend perpendicularly to the extending direction are disposed in the middle.

The integrally molded surface fastener 10 having such a structure of the present invention can be manufactured easily and continuously by changing part of the structure of the device disclosed in the above-mentioned Japanese Patent Laid-Open Publication No. 11-56413.

FIG. 8 shows schematically an embodiment preferred as a continuous production device for the integrally molded surface fastener and its production procedure.

Reference numeral 111 in the Figure denotes an injection nozzle of the continuous injection unit 110. A curved face at the front end of the nozzle 111 has a circular face 111a having a substantially the curvature as a cylindrical drum 100, described later. The injection nozzle 111 is provided with a gap similar to the thickness of the base member 1 to be molded on that curved face of the cylindrical drum 100. This injection nozzle 111 is formed of T-shaped die and molten resin 11 is injected continuously from a resin injection port 111b formed in the center of the front end circular face 111a at a predetermined resin pressure and a specified flow rate.

Because the basic structure of the cylindrical drum 100 can be obtained by changing partially the drum structure disclosed in the above-mentioned Japanese Patent Laid-Open Publication No. 11-56413, the structure will not be described so much in detail. The cylindrical drum 100 is constructed in the form of a hollow drum having a water-cooled jacket 100a, which serves as an internal cooling means and a circumferential face thereof has a function as a partial molding face for the molded surface fastener 10. As described above, the aforementioned gap is secured between the circumferential face and the front end circular face 111a of the injection nozzle 111 and the axis of the cylindrical drum 100 is set up in parallel to the injection port 111b.

Figure 7:
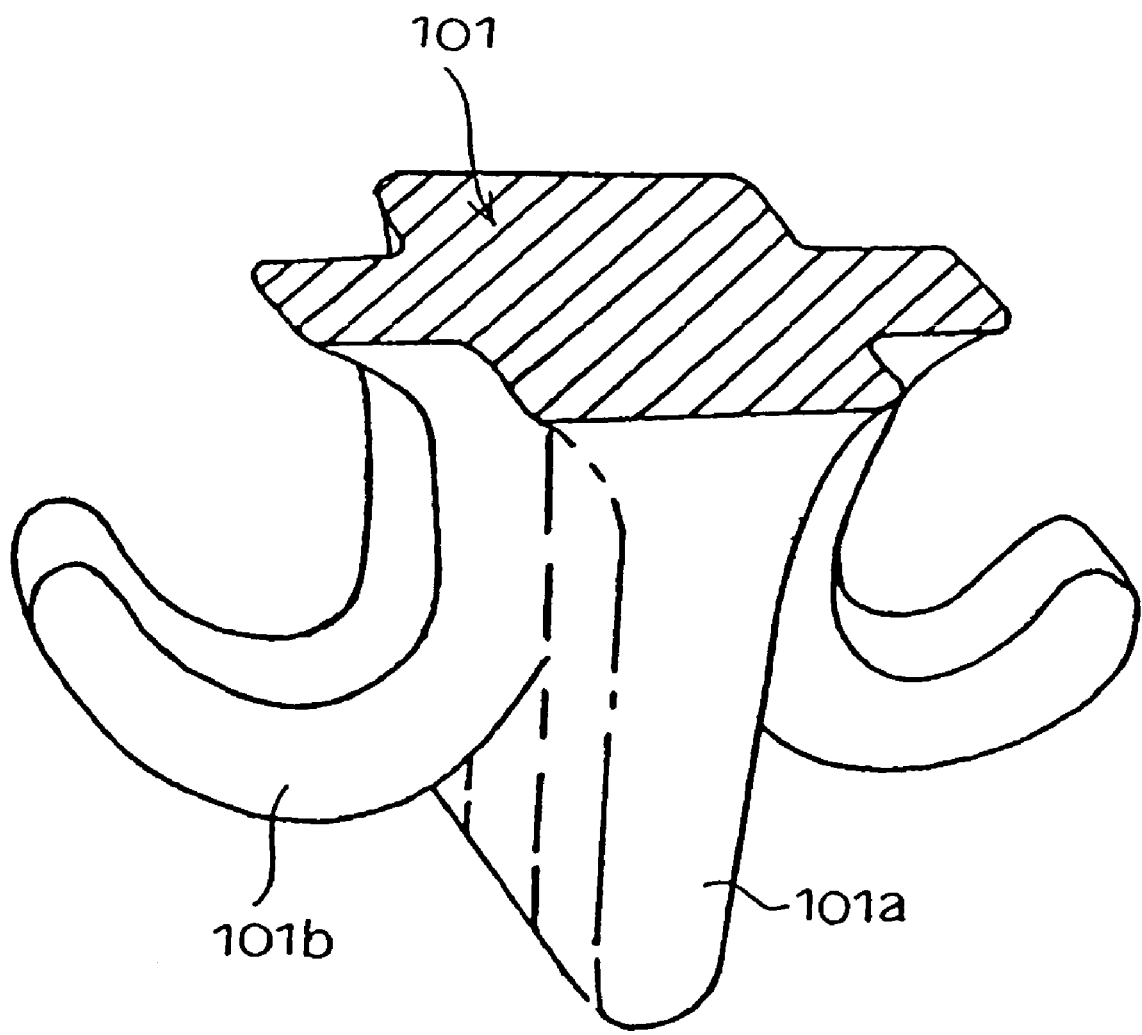
FIG. 7 is a perspective view showing an embodiment of a preliminary element molding cavity for the engaging element.

The most important component of the present invention is the rotation drum 100 and more specifically, the structure of a preliminarily molded element molding cavity 101 formed on the circumferential face thereof. The cavity 101 of this embodiment is open in the form of a cross on the circumferential face of the rotation drum 100 as shown in FIG. 7 and a main cavity 101a is formed in a straight line up to a predetermined depth while a second engaging element molding cavity 101b is formed at a position ⅓ the main cavity 101a such that it is branched in the molding direction from the center of a long side of a rectangular section, extended obliquely and curved with its front end directed to the circumferential face of the drum. The section is rectangular on deeper side from the position ⅓ from the opening of the main cavity 101a and the sectional area decreases as it goes deeper and the final end terminates with a circular face. Therefore, the entire shape of the preliminarily molded element molding cavity 101 of this embodiment resembles the shape of a three-pronged lance.

The cylindrical drum 100 in which such cavities are formed in the circumferential face in large quantities is rotated in one direction and at a time, molten resin 11 is injected continuously from the injection nozzle 111 toward the circumferential face. Consequently, the base member 1 is molded on the circumferential face of the drum and the cavity 101 is filled with part of the molten resin, so that a preliminarily molded element 2' is molded integrally at a time, which comprises a preliminarily molded pillar portion 21' extending linearly from the proximal end portion up to a position ⅓ while having a cross shaped section, and comprises a preliminarily molded head 22' composed of a preliminarily molded first engaging portion 22a' extending from the preliminarily molded pillar portion 21' up to the top end linearly and hook-like second engaging portions 22b branching two-way from the top end of the preliminarily molded pillar portion 21'. A belt-like preliminarily molded surface fastener 10' is molded continuously along the circumferential face of the rotating cylindrical drum 100.

The preliminarily molded surface fastener 10' moved and supported by the circumferential face of the rotating cylindrical drum 100 is cooled aggressively by the water-cooled jacket 100a incorporated in the cylindrical drum 100 and a cooling water bath 102 in which the lower half of the cylindrical drum 100 is immersed and after that, it is peeled from the circumferential face of the cylindrical drum 100 by a take-up roller 103 which is a take-up means. The peeled preliminarily molded surface fastener 10' is carried to a with-heat pressing portion 150 disposed in a next process by upper and lower feed rollers 104*a*, 104*b*.

Figure 8A:
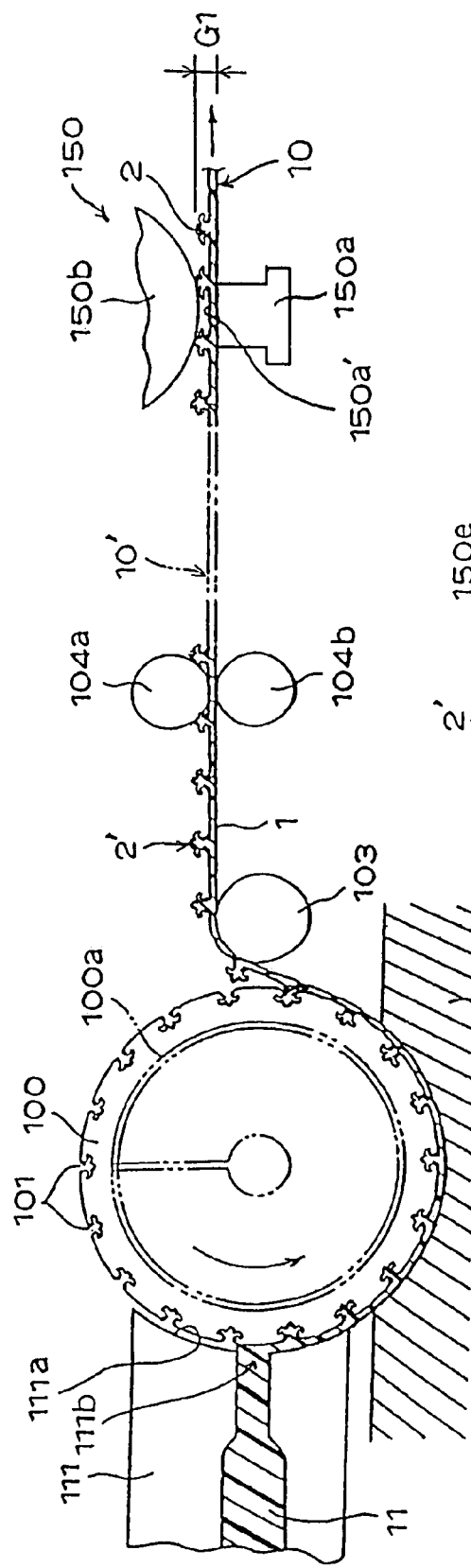
FIG. 8 is a process explaining diagram showing schematically a production process of the molded surface fastener.

As shown in FIG. 8A, the with-heat pressing portion 150 extends in a direction perpendicular to the feeding direction of the preliminarily molded surface fastener 10' and comprises an ultrasonic horn 150*a* having a carrying face 150*a'* for supporting the preliminarily molded surface fastener 10' from below and a upper pressing roll 150*b* disposed with a predetermined gap G1 with respect to the carrying face 150*a'*. The gap G1 between the ultrasonic horn 150*a* and the upper pressing roll 150*b* is set slightly smaller than the dimension obtained by adding the setting dimension in the vertical direction of the engaging head 22 to a sum of the dimensions in the vertical direction of the base member 1 and the pillar portion 21 of the molded surface fastener of the present invention.

Figure 8B:
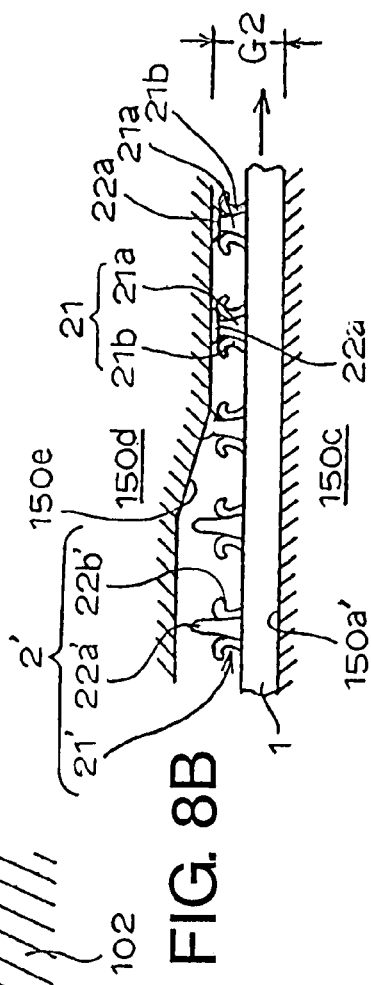

In addition to the construction comprising the ultrasonic horn 150*a* and the upper pressing roll 150*b*, the with-heat pressing portion 150 of the present invention may comprise a lower supporting member 150*c* whose top face acts as a carrying face 150*a'* for the preliminarily molded surface fastener 10' and an upper with-heat pressing member 150*d* having a downward inclined face 150*e* in the feeding direction of the preliminarily molded surface fastener 10' as shown in FIG. 8B. In this case, a gap G2 which is the narrowest portion between the carrying face 150*a*40 of the upper with-heat pressing member 150*d* and the inclined face 150*e* is set slightly smaller than a dimension gained by adding the setting dimension in the vertical direction of the engaging head 22 to a sum of the dimensions in the vertical direction of the base member 1 and the pillar portion 21.

Figure 9:
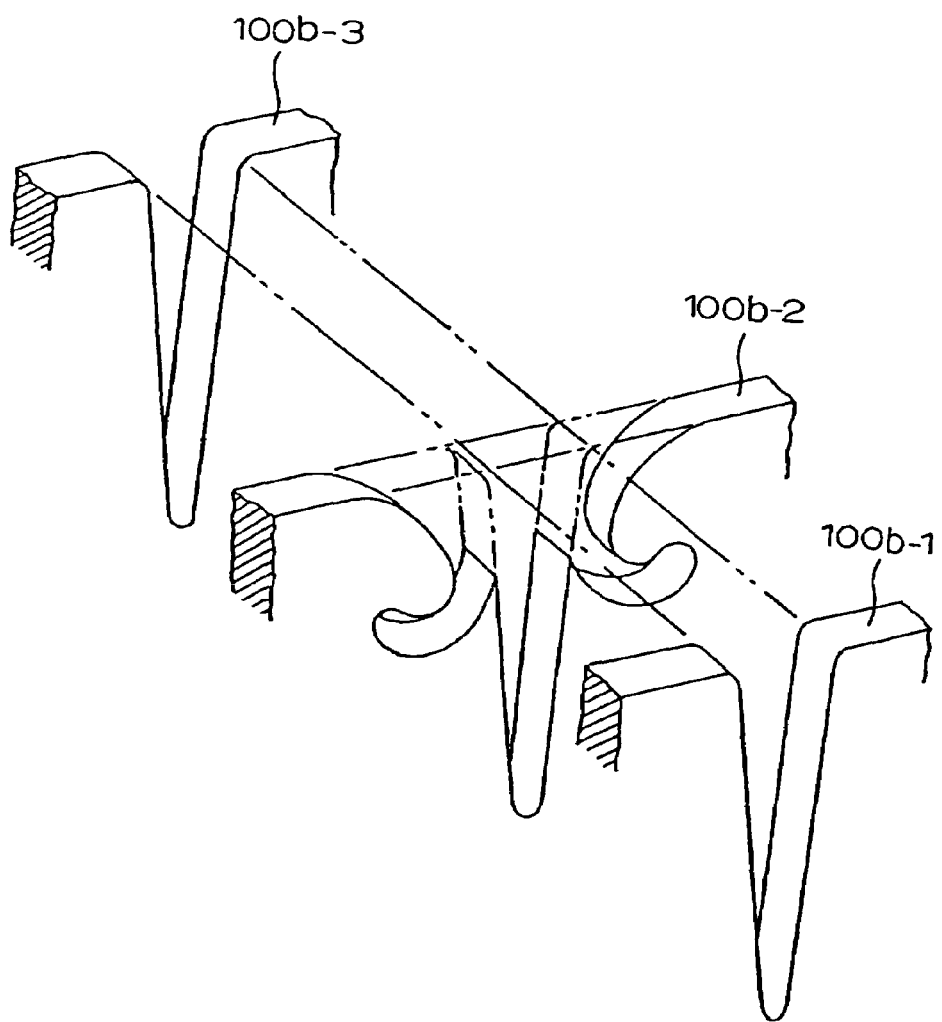
FIG. 9 is a partial perspective view showing a specific structure example of the preliminary element molding cavity of the present invention.

FIG. 9 shows a specific structure example of the preliminarily molded element molding cavity 101 of this embodiment. In this case, the cylindrical drum 100 is constructed by overlaying plural thin ring-like discs 100*b* coaxially. This Figure indicates a case where a single preliminarily molded element molding cavity 101 is formed with three first to third ring-like discs 100*b*-1 to 100*b*-3. In FIG. 9, cut-outs are drawn in larger sizes to facilitate understanding and the respective ring-like discs 100*b*-1 to 100*b*-3 are represented in smaller thickness as compared to that size. However, actually the thickness thereof is sufficiently larger than the size of the cut-out.

Referring to the Figure, of the three ring-like discs 100*b*-1 to 100*b*-3, the second ring-like disc 100*b*-2 sandwiched in the middle is cut out linearly in a predetermined length with a predetermined cut-out width along the circumferential direction while that width decreases gradually. Right and left branches are formed from a position substantially ⅓ from the circumferential face so that circular cut-outs are made with their front ends directed to the circumferential face side. On the other hand, in the first and third ring-like discs 100*b*-1, 100*b*-3 which sandwich the second ring-like disc 100*b*-2, their initial cut-outs width along the circumferential direction are set substantially ½ shorter than the width of the initial cut-out in the second ring-like disc 100*b*-2 and become the width as that of a straight cut-out portion in the second ring-like disc 100*b*-2 after it passes the circular cut-out in the second ring-like disc 100*b*-2, so that a straight cut-out as long as the cut-out thereof is produced.

By overlaying these first to third ring-like discs 100*b*-1 to 100*b*-3 successively and further the ring-like disc 100*b* having no cut-out of the diameter, the preliminary engaging element molding cavity 101 having an opening represented by hatching in FIG. 7 is produced. This cavity 101 is formed by tilting by 5 to 15° with respect to the rotation direction of the cylindrical drum 100. As a result of this procedure, when the preliminarily molded surface fastener 10' is peeled from the cylindrical drum 100, the preliminarily molded element 2' is erected upright on the surface of the base member 1.

The drum structure shown in FIG. 9 indicates an example in which it is constructed by overlaying a plurality of ring-like discs 100*b* as described above. Even in case of a cylindrical drum constructed of a single material, it is easily understood that the cavities 101 having the above-mentioned hole structure can be formed all at once at its circumferential face by mechanical processing, electric discharge machining or etching processing. In the meantime, the shape of the preliminarily molded element molding cavity 101 is not restricted to the above-described one but may be changed appropriately.

The cylindrical drum 100 having such a structure is rotated in a direction indicated with an arrow in FIG. 8A by a well known drive unit (not shown). As described above, the cylindrical drum 100 contains the water-cooling jacket 100*a* internally and the cooling water bath 102 is provided below the drum 100 so that a substantially lower half of the cylindrical drum 100 is immersed within the cooling water bath 102. A pair of the take-up rollers 103, front and rear, are provided forward and obliquely upward of this cooling water bath 102 and a trimming unit (not shown) having a cutting means for cutting ears of the belt-like preliminarily molded surface fastener 10', which is a raw material for the molded surface fastener 10 of a final product of the present invention, is installed. Additionally, the with-heat pressing unit 150 for forming the engaging head 22 is provided forward of the trimming unit through feed rollers 104*a*, 104*b*.

According to this embodiment, an ultrasonic tool horn 150*a* is adopted as the with-heat pressing unit 150. It is permissible to use a high frequency electrode die instead of this ultrasonic horn 150*a*. Because in this internal heating unit 150, only a pressed portion of a resin molded portion pressed by the pressing roll 150*b* is heated locally inside the resin and deformed, the other portion than that deformed portion is not affected by heating and therefore, the physical property of resin molded portion other than the deformed portion does not change relative to its initial state. Therefore, the present invention eliminates the necessity of taking into account an influence of heating upon other portions than the deformed portion which is generated by ordinary external heating.

The with-heat pressing unit 150 has an acting face on a carrying route for the preliminarily molded surface fastener 10' and supports the carried preliminarily molded surface fastener 10' from below. The acting face constitutes the carrying face 150*a'* for the bottom face of the base member 1 of the preliminarily molded surface fastener 10' which is carried. The bottom end of the pressing roll 150*b* is disposed at a position lower than a flat plane in which the front end of the preliminarily molded first engaging portion 22*a'* of the preliminarily molded surface fastener 10' passes. The gap setting between the ultrasonic horn 150*a* and the pressing roll 150*b* at this time is determined by an interval between the top face of the engaging head 22 of the molded surface fastener 10 which is produced and the bottom face of the base member 1. On the other hand, the top face of the ultrasonic horn 150*a* disposed below and opposing the pressing roll 150*b* is positioned on a flat plane in which the bottom face of the base member 1 of the preliminarily molded surface fastener 10' moves.

The supporting position of the pressing roll 150b can be adjusted with a height adjusting means (not shown) and a heating temperature and heating velocity of the with-heat pressing unit 150 can be controlled easily with an applied electricity. Further, because rapid heating is possible different from the external heating with conventional heating roll or heating plate, secondary molding is possible by synchronizing with the molding velocity for the primary molded product. Further because heating can be concentrated locally, the pressing member such as the pressing roll 150b can be reduced in size thereby an installation space being reduced together with the internal heating unit. The pressing roll 150b is rotated aggressively by synchronizing with the feeding speed for a molded product.

The procedure for producing the molded surface fastener 10 of the present invention using the production device for the molded surface fastener having the above-described structure will be described specifically based on FIGS. 8 and 9.

The molten resin 11 injected continuously from the injection nozzle 111 at a predetermined resin pressure is introduced continuously into a gap formed on the cylindrical drum 100 rotating in one direction. By this introduction, the gap is filled with part of the molten resin 11 so as to mold the base member 1 and then, the molten resin is applied to the molding cavities 101 for the preliminarily molded element, formed in the circumferential face of the cylindrical drum 100 successively and with a rotation of the cylindrical drum 100, the preliminarily molded surface fastener 10' is molded continuously by molding preliminarily molded elements 2' having a peculiar configuration as shown in FIG. 12, which are a number of primary molded members, on the surface of the base member 1.

The preliminarily molded surface fastener 10' having the primary configuration of the surface fastener 10 of the present invention is rotated along a substantially half circumference of the cylindrical drum 100 under a guide of the take-up roller 103 and in this while, the preliminarily molded surface fastener 10' is cooled aggressively by the water cooling jacket 100a from inside of the cylindrical drum 100 while it passes through the inside of the cooling water bath 102 in which cooling water at a low temperature (about 15° C.) circulates, so that it is cooled rapidly thereby enhancing the solidification. Because the preliminarily molded surface fastener 10' is solidified by this rapid cooling before its crystallization progresses, the base member 1 and the preliminarily molded elements 2' entirely have much plasticity.

Figure 10:
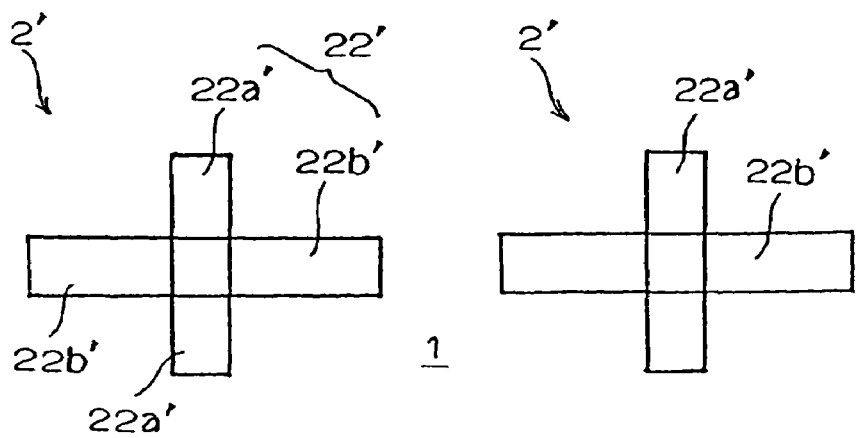
FIG. 10 is a plan view showing an embodiment of the preliminary molded element.
Figure 11:
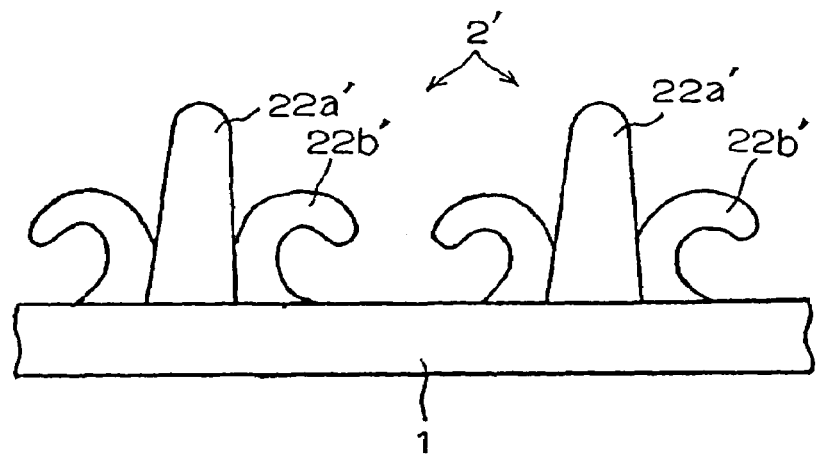
FIG. 11 is a side view thereof.
Figure 12:
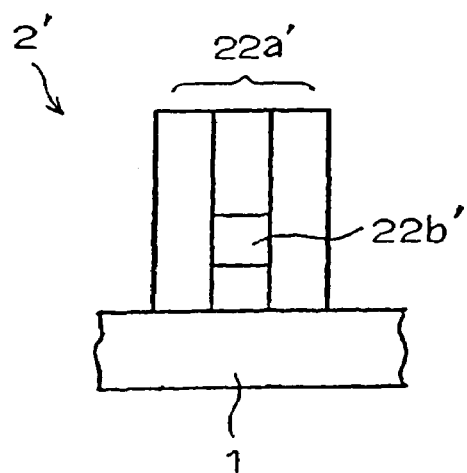
FIG. 12 is a front view thereof.

When the preliminarily molded surface fastener 10' after this solidification ends is taken by the paired feed rollers 104a, 104b, upper and lower ones, through the take-up roller 103, each preliminarily molded element 2' having the configuration shown in FIGS. 10 to 12 is pulled out from the cavity 101 smoothly while deformed elastically. To peel out the preliminarily molded surface fastener 10' molded in this way from the cylindrical drum 100, the paired feed rollers 104a, 104b, upper and lower ones, which rotate in opposite directions synchronously with each other as described above are used. Although the feed rollers 104a, 104b may have a smooth circumferential face, if a plurality of rows of guide grooves extending along the circumference for accommodating and guiding the preliminarily molded element 2' are formed in the circumferential face or an elastic layer (not shown) is formed of mild urethane thereon, much convenience can be expected because the preliminarily molded element 2' may not be damaged in vain.

The preliminarily molded surface fastener 10' molded on the circumferential face of the cylindrical drum 100 has a number of the preliminarily molded elements 2' erected substantially vertically from a surface of the base member 1. According to this embodiment, as shown in FIGS. 10 to 12, each of the number of the preliminarily molded elements 2' comprises the preliminarily molded pillar portion 21' having a cross shaped section up to a height of substantially ⅓ from its proximal end position and the preliminarily molded head 22', which is composed of preliminarily molded first engaging portions 22a' having a long rectangular section in the direction perpendicular to the molding direction and extending linearly from the top end of the preliminarily molded pillar portion 21' along the same axis line as the preliminarily molded pillar portion 21', and paring preliminarily molded second engaging portions 22b' branched in two ways back and forth in the molding direction from the top end of the preliminarily molded pillar portion 21'.

Upon molding the preliminarily molded element 2', the height of the preliminarily molded first engaging portion 22a' from the base member 1 is set higher than the height of the preliminarily molded second engaging portion 22b' from the base member 1 taking into account a deformation amount of the preliminarily molded first engaging portion 22a'. Then, the preliminarily molded first engaging portion 22a' is deformed into a thin plate which stretches to the right and left sides like wings by pressing with heat from above with the with-heat pressing unit 150. At this time, only the preliminarily molded first engaging portion 22a' is pressed with heat by the with-heat pressing unit 150 according to this embodiment and no pressure with heat is applied to the preliminarily molded second engaging portion 22b'. Therefore, the preliminarily molded pillar portion 21' and the preliminarily molded second engaging portion 22b' keep their original configurations and turn to the pillar portion 21 and the second engaging portion 22b respectively at the time of completion.

After the ear portions existing on the right and left sides in width direction are cut out with the trimming unit (not shown), the preliminarily molded surface fastener 10' molded by the cylindrical drum 100 is introduced in between the ultrasonic horn 150a and the pressing roll 150b of the with-heat pressing unit 150 through the feed rollers 104a, 104b. When the preliminarily molded head 22' passes between the ultrasonic horn 150a and the upper pressing roll 150b, heat is generated from inside of the top end portion of the preliminarily molded first engaging portion 22a' pressed by the pressing roll 150b under a vibration of the ultrasonic horn 150a, so that when it passes the with-heat pressing unit 150, from the top end to the top face of the preliminarily molded second engaging portion 22b' is melted and deformed. Consequently, a flat wing-like thin first engaging portion 22a is molded such that its top face is of a substantially flat plane, which is slightly larger than the width of the first pillar portion 21a and extends in the direction of a long side of the first pillar portion 21a.

After as described above, the first engaging portion 22a is softened with a heat by the ultrasonic horn 150a and deformed into a substantially wing-like thin plate by pressing, its crystallization progresses at its heated portion by gradual cooling and solidification, so that the stiffness of the first engaging portion 22a becomes higher than those of the pillar portion 21, the base member 1 and the hook-like second engaging portion 22b. Consequently, because of the base member 1 and the engaging element 2 of the preliminarily molded surface fastener 10' possessing excellent plasticity due to rapid cooling and solidification, only the first engaging portion 22a has a higher stiffness than the other portions, in case of even the engaging element 2 of the molded surface fastener 10 having an extremely high plasticity despite its minute dimension, the hook-like second engaging portion 22b having a high engaging force because of its shape possesses the plasticity as the pillar portion 21 while the stiffness of the first engaging portion 22a is secured. As a result, a holding force in the separation direction to the mating pile is secured.

Even the molded surface fastener 10 having both characteristics, plasticity and minute engaging element configuration which the present invention proposes provides a high quality product which ensures an excellent tactile feeling and extremely stabilized configuration securing a predetermined engaging force and can bear repeated usage of several times sufficiently.

The shape of the engaging head 22 as seen in a plan view molded at this time as shown in FIG. 1 provides a cross shape produced by the rectangular first engaging portion 22a having circular front end portions and a short strip-like second engaging portion extending linearly intersecting this. Consequently, the pillar portion 21 of the engaging element 2 is composed of the first and second pillar portions 21a, 21b, extending in the molding direction and the direction perpendicular to that direction respectively with the cross-shaped section. Because the first and second engaging portions 22a, 22b are supported independently as if they are cantilevered by the pillar portion 21, substantially, the structure as four-leaf hook type engaging head is produced and thus, various problems accompanying the mushroom type engaging element such as a stronger separation strength than necessary and hanging by a pile never occur.

Although the present invention has been described about a case where the extending direction of the first engaging portion 22a from the pillar portion 21 is in a direction perpendicular to the molding direction, if the main cavity 101a of the molding cavity 101 for the preliminarily molded element 2' is formed to be longer along the molding direction and the hook-like second engaging portion molding cavity 101b is formed so as to extend perpendicularly to the molding direction, the extending directions of the first engaging portion 22a and the second engaging portion 22b can be changed. Thus, if the cavities 101 are formed in the circumferential face of the cylindrical drum 100 by mixing these directions as shown in FIG. 5, it is possible to produce the molded surface fastener 10 mixed with the engaging heads 22 in which the extending directions of the first engaging portion 22a and the second engaging portion 22b are reverse to each other as shown in FIG. 6.

Figure 13:
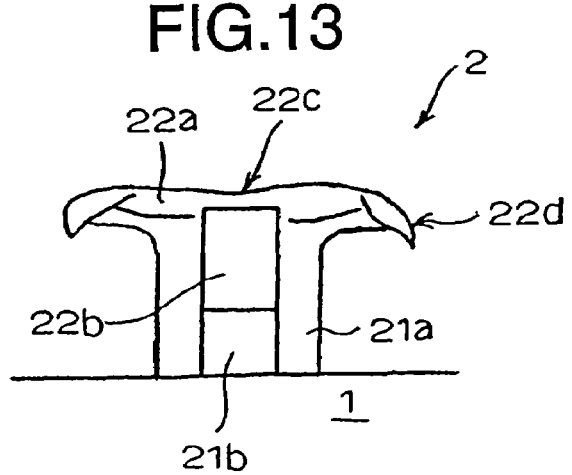
FIG. 13 is a structure explaining diagram showing a modification of the first embodiment.

FIG. 13 shows the configuration of the molded surface fastener 10 according to a modification of the above embodiment. It is understood that the front end portion of the first engaging portion 22a of the first embodiment is bent downward. That is, according to this modification, the first engaging portion 22a is not molded in the form of a mere flat plate but by curving the front end of the extending side downward in the form of a hook, a curved portion 22d is formed so as to increase the engaging strength and separation strength with the mating pile up to a desired strength. To curve the front end of the engaging head 22 downward in the form of a hook, when the preliminarily molded element 2' of the preliminarily molded surface fastener 10' molded by the cylindrical drum 100 is melted and deformed under a pressure by the with-heat pressing unit 150, the frequency of the ultrasonic horn is set so that the internal heating in the element material is higher than normal, or the diameter of the pressing roll 150b is enlarged so as to set up a relatively longer pressing time. Consequently, softening of the front end portion of the first engaging portion 22a progresses so that it is curved by its own weight.

Further, the present invention includes a case where the quantity of deformation of the preliminarily molded first engaging portion 22a' in the pressing direction is increased in the with-heat pressing portion 150. In this case, the top surface of the preliminarily molded second engaging portion 22b' of the preliminarily molded head 22' is melted and deformed by pressing so as to form the top face into a flat plane and an expanded portion is formed by expanding slightly in the width direction horizontally from that flat plane. As a result, the second engaging portion 22b has the flat top face in addition to its hook shape and includes right and left expanding portions which expand in the width direction. Thus, in addition to the engagement strength with the mating pile, the separation strength is also increased.

Figure 14:
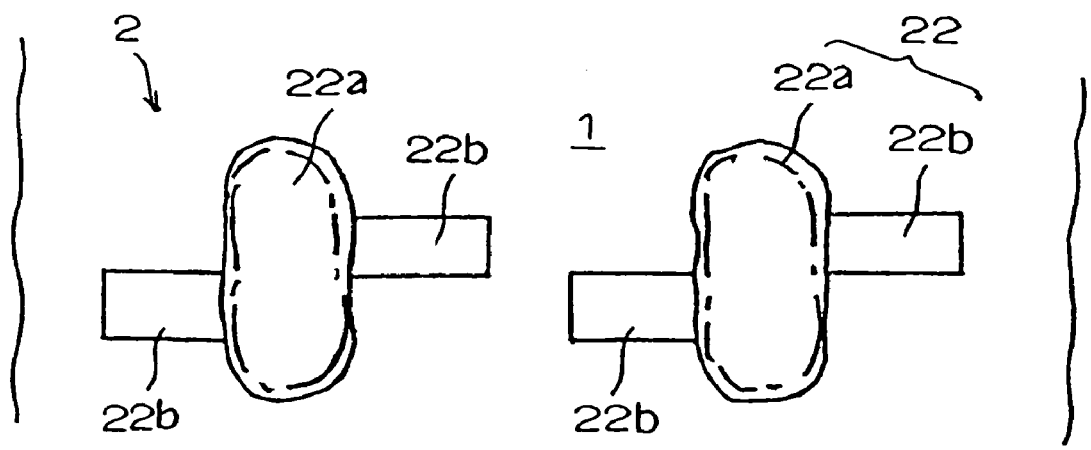
FIG. 14 is a plan view showing a final shape of the molded surface fastener according to the second embodiment of the present invention.
Figure 15:
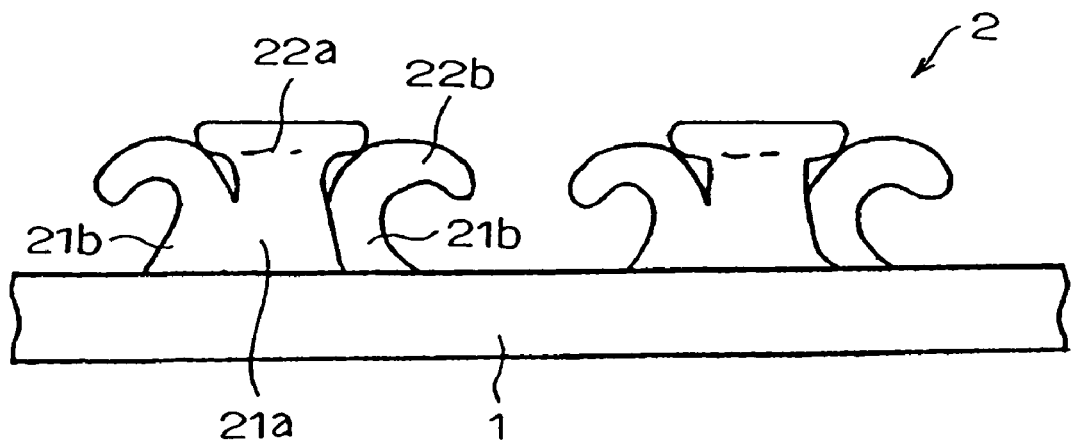
FIG. 15 is a side view of the molded surface fastener.
Figure 16:
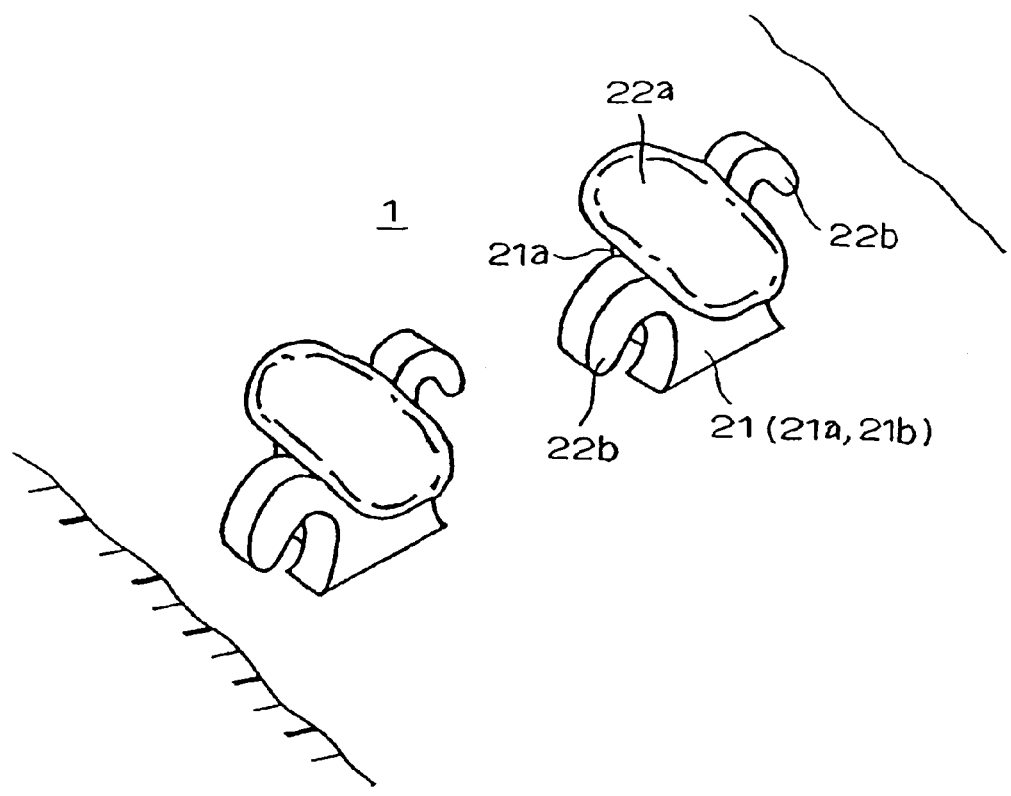
FIG. 16 is a partial perspective view of the molded surface fastener.

FIGS. 14 to 16 show the second embodiment of the present invention. According to this embodiment (not shown), on the preliminary molding stage, the preliminarily molded first engaging portion erected linearly, which is a composition of the preliminarily molded element, is divided to ½ sections in the direction perpendicular to the molding direction (right and left) and for each section, hook-like preliminarily molded second engaging portions are extended in parallel to each other in opposite directions to each other along the molding direction from the first engaging portion.

By passing the preliminarily molded surface fastener having the preliminarily molded element 2' having such a configuration through the with-heat pressing unit 150 shown in FIG. 8, which is a producing portion, the engaging element 2 having a configuration shown in FIGS. 14 to 16 is molded. For this engaging element 2, by pressing the preliminarily molded first engaging portion of the preliminarily molded element from above with heat so as to melt (or soften) and deform, the first engaging portion 22a with the wing-like thin plate stretched to the right and left sides is molded. In case of this embodiment also, the preliminarily molded second engaging portion does not undergo pressing and deformation by the with-heat pressing unit 150, and its own configuration is maintained so as to produce the hook-like second engaging portion 22b.

Figure 17:
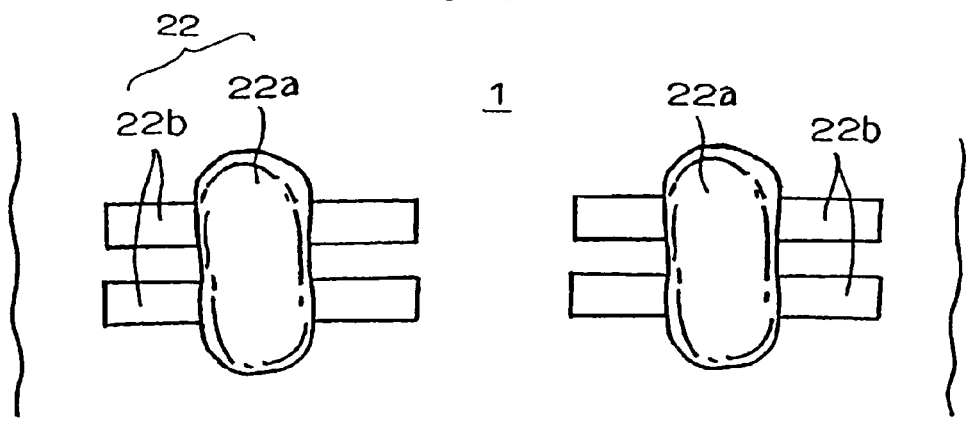
FIG. 17 is a plan view showing the final configuration of the molded surface fastener according to the second embodiment of the present invention.
Figure 18:
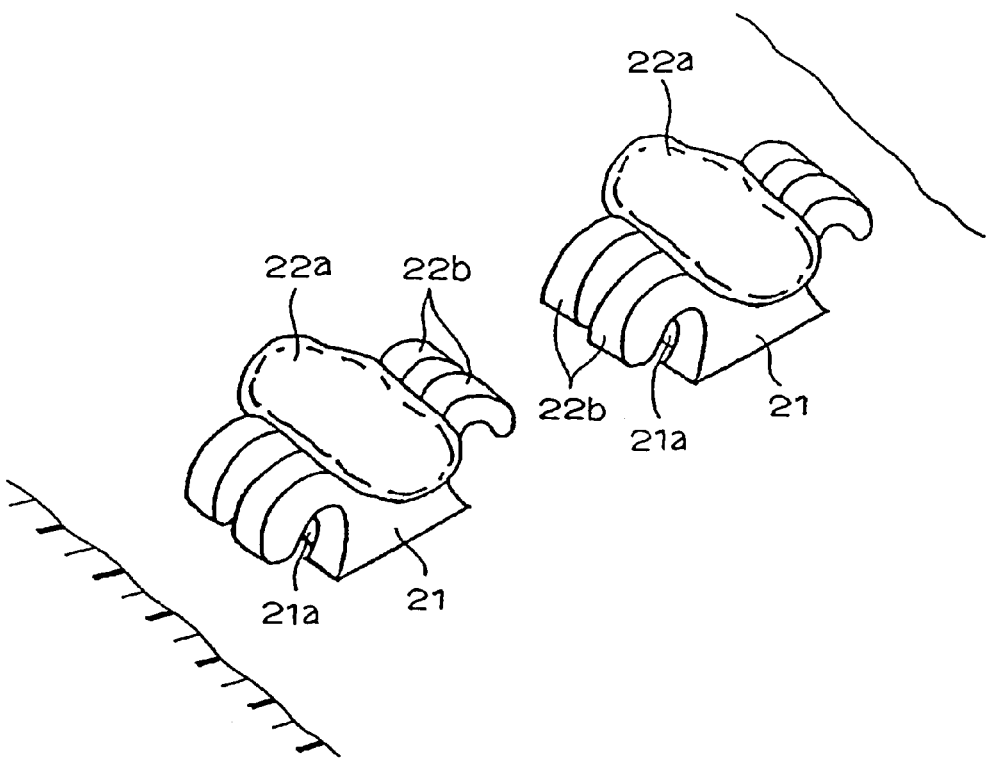
FIG. 18 is a partial perspective view of the molded surface fastener.

FIGS. 17 and 18 show the third embodiment of the present invention. As for the configuration of the engaging element 2 of this embodiment, as understood from the figures, a pair of the second engaging portions 22b extending in parallel back and forth in one direction are formed and the first engaging portion 22a composed of wing-like thin plate extends to the right and left across the right and left second engaging portions 22b in pair.

Figure 19A:
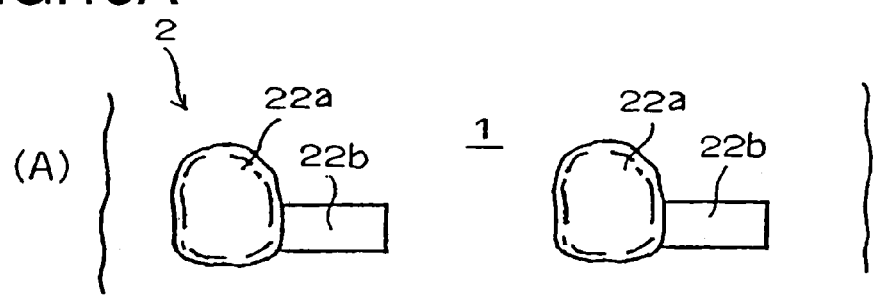
FIG. 19 is a structure explaining diagram showing a modification of the second embodiment.
Figure 19B:
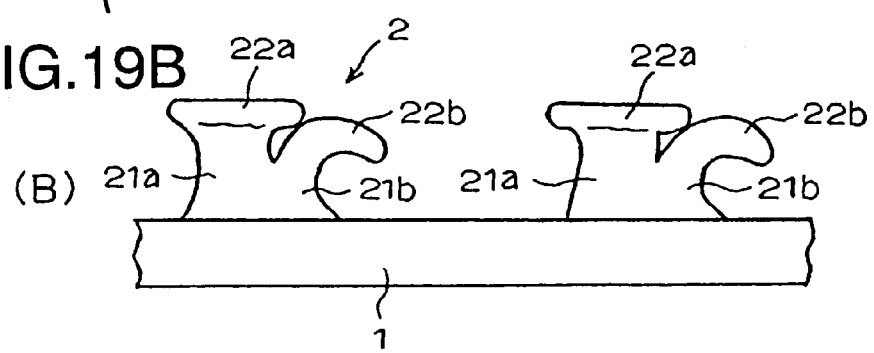

FIGS. 19A and 19B show a further modification of the second embodiment. According to this modification, the first engaging portion 22a composed of the wing-like thin plate and the second engaging portion 22b composed of hook piece are disposed such that they intersect at right angle as seen in a plan view and they provide a substantially letter L shape because they extend in each single direction with respect to the pillar portion 21 as seen in a top view. In case of this modification, because the first engaging portion 22a and the second engaging portion 22b do not intersect like a cross like the above-described first embodiment, the engagement ratio with the mating piles decreases and therefore, a gap between adjacent engaging elements 2 is preferred to be smaller than the first embodiment.

Figure 20:
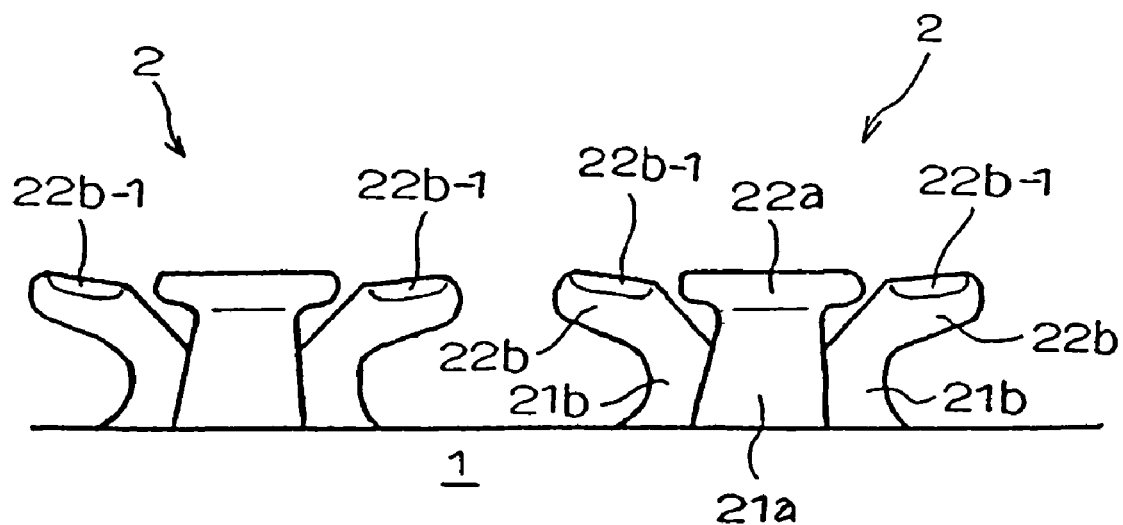
FIG. 20 is a side view showing another modification of the first embodiment.

FIG. 20 shows a further modification of the first embodiment. According to this modification, the preliminarily molded second engaging portion 22b' is not molded into a hook whose front end curves toward the surface of the base member 1 on the preliminary molding of the engaging element 2, but molded so that it rises linearly and obliquely upward from the top end of the second pillar portion 21*b* with a mild gradient. Then, the top surface of this molded preliminarily molded second engaging portion 22*b* is pressed with heat by a predetermined amount with the preliminarily molded first engaging portion 22*a'* so as to melt (soften) and deform. As a result, as shown in FIG. 20, the top face of the second engaging portion 22*b* turns to a flat plane and the expanding portions 22*b*-1 which expand horizontally to the right and left from this flat plane are formed. This expanded portion 22*b*-1 supplements a reduction of an engagement force, which results from that the configuration of the second engaging portion 22*b* turns to the hook shape extending linearly, so as to secure a desired engagement force. Additionally, the aforementioned flat surface improves the itchy feeling of the surface of that surface fastener.

The second and third embodiments and the modifications exert the operation and effect as the first embodiment. The above-mentioned embodiments and modifications are typical examples of the present invention and, needless to say, may be modified in various ways by those skilled in the art.

The invention claimed is:

1. An integrally molded surface fastener of synthetic resin in which a number of fine engaging elements, which engage/disengage a mating pile piece, are molded integrally on a surface of a flat base member, wherein
   each engaging element comprises a pillar portion having a predetermined height and an engaging head composed of first and second engaging portions, which extend from a top end of the pillar portion along the surface of the base member in a first direction (x) and in a second direction (y) different from the first direction,
   the first and second engaging portions have different shapes,
   the pillar portion includes a first pillar portion and a second pillar portion which have a rectangular section and are formed integrally such that they intersect each other, the first engaging portion has a flat wing-like thin plate shape extending in a long side direction of the first pillar portion from a top end of the first pillar portion,
   the second engaging portion has a hook shape extending in a long side direction of the second pillar portion from a top end of the second pillar portion.
   there is a difference in distance between a distance from the surface of the base member to the front end of the first engaging portion and a distance to the front end of the second engaging portion, and
   the second engaging portion is formed in a lower height than the first engaging portion.

2. The integrally molded surface fastener according to claim 1, wherein the second engaging portion is constituted of engaging pieces which substantially intersect with the first engaging portion at right angle across the top end of the pillar portion and extend in opposite directions each other.

3. The integrally molded surface fastener according to claim 1, wherein the second engaging portion is constituted of a hook piece and a front end of which is curved toward the base member.

4. The integrally molded surface fastener according to claim 1, wherein the pillar portion has a horizontal section which intersects with the first direction (x) and the second direction (y) of the first and second engaging portions in a same direction.

5. The integrally molded surface fastener according to claim 1, wherein a central portion of a top face of the engaging head is slightly dented.

6. The integrally molded surface fastener according to claim 1, wherein the first engaging portion is disposed perpendicularly to a molding direction of the base member while the second engaging portion is disposed in parallel to a molding direction of the base member.

7. A method of production for the integrally molded surface fastener according to claim 1, comprising:
   rotating a cylindrical drum in one direction, the cylindrical drum having a number of preliminarily molded element molding cavities each composed of a main cavity which is open in a circumferential face and extends linearly up to a predetermined depth and a second engaging portion molding cavity which is not open in the circumferential face and is branched from halfway of the main cavity and extends in a molding direction or in a lateral direction with respect thereto;
   injecting molten resin continuously to the circumferential face of the cylindrical drum, molding the base member along the circumferential face while molding a number of preliminarily molded elements on a back side of the base member such that they erect upright;
   peeling a belt-like preliminarily molded surface fastener from the circumferential face of the cylindrical drum, the preliminarily molded surface fastener having the preliminarily molded elements on the base member which moves carried by the circumferential face of the rotating cylindrical drum;
   feeding the preliminarily molded surface fastener peeled continuously to a with-heat pressing portion; and
   pressing at least a preliminarily molded first engaging portion erected linearly of the preliminarily molded elements erected integrally from the surface of the base member of the carried preliminarily molded surface fastener with heat, melting and deforming into a flat wing-like thin plate so as to mold the first engaging portion successively.

8. The method of continuous production for the integrally molded surface fastener according to claim 7, further comprising:
   melting and deforming the preliminarily molded first engaging portion into the flat wing-like thin plate by pressing the with-heat pressing portion with heat; and
   melting and deforming a top end of a preliminarily molded second engaging portion at a time.

* * * * *